(12) United States Patent
Oh

(10) Patent No.: US 12,456,508 B2
(45) Date of Patent: Oct. 28, 2025

(54) MEMORY DEVICE, OPERATION METHOD OF A MEMORY DEVICE, AND OPERATION METHOD OF A MEMORY CONTROLLER

(71) Applicant: Samsung Electronics Co., Ltd., Suwon-si (KR)

(72) Inventor: Taeyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 319 days.

(21) Appl. No.: 18/169,151

(22) Filed: Feb. 14, 2023

(65) Prior Publication Data

US 2023/0305706 A1    Sep. 28, 2023

(30) Foreign Application Priority Data

Mar. 23, 2022   (KR) .................. 10-2022-0036244
May 23, 2022   (KR) .................. 10-2022-0063064

(51) Int. Cl.
*G11C 16/04*    (2006.01)
*G11C 11/4076*   (2006.01)

(52) U.S. Cl.
CPC .............................. *G11C 11/4076* (2013.01)

(58) Field of Classification Search
CPC ................................................. G11C 11/4076
See application file for complete search history.

(56) References Cited

U.S. PATENT DOCUMENTS

| | | | |
|---|---|---|---|
| 8,055,930 B2 | 11/2011 | Bae et al. | |
| 8,705,313 B2 | 4/2014 | Lin et al. | |
| 9,036,436 B2 * | 5/2015 | Bansal | G11C 29/023 |
| | | | 365/194 |
| 9,123,408 B2 | 9/2015 | Jose et al. | |
| 9,124,278 B1 * | 9/2015 | Das | G11C 27/02 |
| 10,255,964 B2 | 4/2019 | Shin et al. | |
| 10,636,475 B2 | 4/2020 | Jun | |
| 10,692,555 B2 | 6/2020 | Oh et al. | |
| 11,175,836 B2 | 11/2021 | Suh et al. | |
| 11,515,865 B1 * | 11/2022 | Foley | H03K 5/14 |
| 2011/0208989 A1 | 8/2011 | Nygren et al. | |
| 2014/0140145 A1 | 5/2014 | Taruishi et al. | |
| 2017/0004869 A1 | 1/2017 | Shin et al. | |
| 2018/0342265 A1 | 11/2018 | Dietrich | |
| 2022/0027067 A1 | 1/2022 | Suh et al. | |
| 2022/0069975 A1 | 3/2022 | Stott et al. | |

FOREIGN PATENT DOCUMENTS

TW    202101193 A    1/2021

* cited by examiner

*Primary Examiner* — Pho M Luu
(74) *Attorney, Agent, or Firm* — Wolf, Greenfield & Sacks, P.C.

(57) ABSTRACT

A method of operating a memory device includes receiving, from a memory controller, an operation command that is synchronized with a clock signal, receiving a data clock signal having a full-rate frequency and a synchronization pattern provided by at least one of a plurality of data signals. The clock signal and the data clock signal are then synchronized using a synchronization operation based on the synchronization pattern. The data clock signal may be received after a first delay time passes from a time point at which the operation command is received. The first delay time is a delay time necessary to prepare the synchronization operation.

20 Claims, 19 Drawing Sheets

Aligned WCK/2_0 to CK_t

Miss-Aligned WCK/2_0 to CK_t

MEMORY DEVICE, OPERATION METHOD OF A MEMORY DEVICE, AND OPERATION METHOD OF A MEMORY CONTROLLER

CROSS-REFERENCE TO PRIORITY APPLICATIONS

This application claims priority under 35 U.S.C. § 119 to Korean Patent Application Nos. 10-2022-0036244 filed Mar. 23, 2022, and 10-2022-0063064 filed May 23, 2022, the disclosures of which are hereby incorporated herein by reference.

BACKGROUND

Embodiments of the present disclosure described herein relate to integrated circuit devices and, more particularly, to integrated circuit memory devices and memory controllers and methods of operating same.

An integrated circuit memory device is classified as: (i) a volatile memory device, in which stored data disappear when a power is turned off, such as a static random access memory (SRAM) or a dynamic random access memory (DRAM), or (ii) a nonvolatile memory device, in which stored data are retained even when a power is turned off, such as a flash memory device, a phase-change RAM (PRAM), a magnetic RAM (MRAM), a resistive RAM (RRAM), or a ferroelectric RAM (FRAM).

The DRAM is widely used as a system memory of a computing system or a mobile device. In particular, an LPDDR DRAM capable of being driven at a low power is used in the mobile system. A clock signal CK for a command/address and a data clock signal WCK for data are separately used in the LPDDR DRAM. In this case, the data clock signal synchronization between the clock signal CK and the data clock signal WCK is required for the reliability of operation. According to the definition of the LPDDR standard, the data clock signal WCK is driven in a state of decreasing a frequency to a half for the data clock signal synchronization, and after the data clock signal synchronization, the data clock signal WCK is driven at a normal frequency. Unfortunately, as will be understood by those skilled in the art, the frequency change of the data clock signal WCK typically causes an increase in the complexity of circuit and a decrease in the quality of the signal.

SUMMARY

Embodiments of the present disclosure provide a memory device with improved performance and improved reliability, an operation method of the memory device, and an operation method of a memory controller.

According to some embodiments of the inventive concept, an operating method of a memory device includes: receiving an operation command, which is synchronized with a clock signal, from a memory controller, receiving a data clock signal having a full-rate frequency from the memory controller, receiving a synchronization pattern through at least one of a plurality of data signals, and performing a synchronization operation based on the synchronization pattern such that the data clock signal and the clock signal are synchronized.

According to another embodiment, an operating method of a memory controller, which is configured to control a memory device, includes sending a CAS command and a read command to the memory device, and then, immediately after a first delay time passes from a time point at which the CAS command is sent, sending a data clock signal having a full-rate frequency to the memory device, and sending a synchronization pattern to the memory device through at least one of a plurality of data signals, and after a second delay time passes from a time point at which the data clock signal commences to be sent, receiving read data from the memory device through the plurality of data signals.

According to another embodiment, a memory device includes: (i) a memory core, (ii) a command/address decoder that receives a clock signal from a memory controller and decodes a command/address signal received from the memory controller based on the clock signal, (iii) a data clock splitter that receives a data clock signal of a full rate from the memory controller and generates four split data clocks by splitting the data clock signal, (iv) a reception circuit that sequentially outputs write data received through a plurality of data signals from the memory controller to the memory core in synchronization with the four split data clocks, and (v) a transmission circuit that sends read data received from the memory core to the memory controller through the plurality of data signals in synchronization with the four split data clocks. In addition, when the data clock signal of the full rate is being received from the memory controller, the data clock splitter performs a synchronization operation on the data clock signal based on a synchronization pattern received through at least one of the plurality of data signals.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that an ordinary one in the art easily implements the invention.

Figure 1:
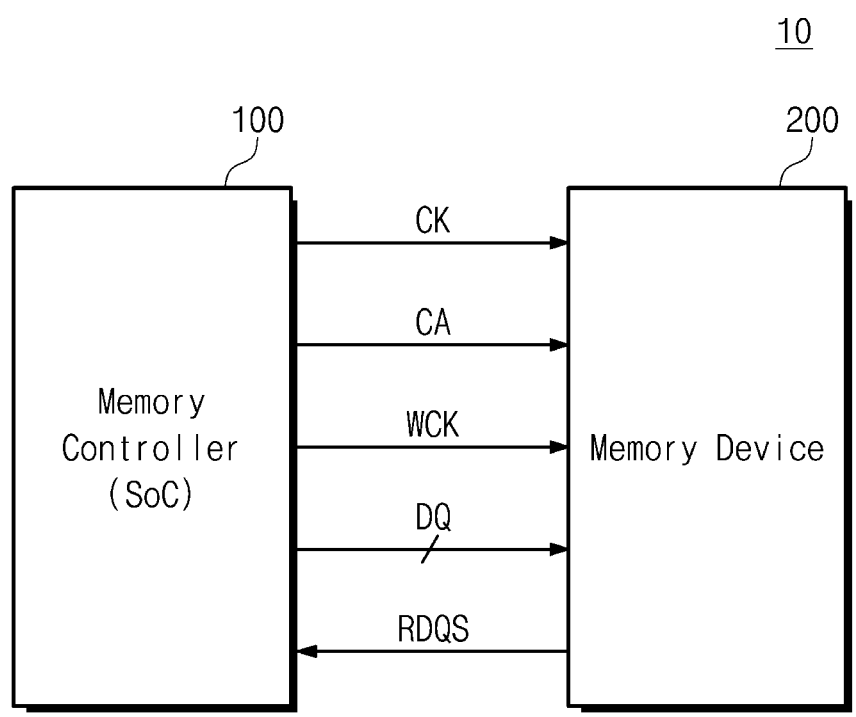
FIG. 1 is a block diagram illustrating a memory system according to an embodiment of the present disclosure.

FIG. 1 is a block diagram illustrating a memory system according to an embodiment of the present disclosure. Referring to FIG. 1, a memory system 10 may include a memory controller 100 and a memory device 200. In an embodiment, the memory system 10 may be a mobile system such as a mobile phone, a smartphone, a tablet personal computer (PC), a wearable device, a health care device, or an Internet of things (IoT) device or may be included therein. Alternatively, the memory system 10 may be a personal computer, a laptop computer, a server, a media player, or an automotive device such as a navigation system, or may be included therein.

The memory controller 100 may be configured to store data in the memory device 200 or to read data stored in the memory device 200. For example, the memory controller 100 may send a clock signal CK, a command/address signal CA, a data clock signal WCK to the memory device 200, may receive a read data strobe signal RDQS from the memory device 200, and may exchange a data signal DQ with the memory device 200. In an embodiment, the memory controller 100 may be a system-on-chip (SoC) or may be included in the SoC.

The memory device 200 may be a dynamic random access memory (DRAM) device. However, the present disclosure is not limited thereto. The memory device 200 may operate under control of the memory controller 100. For example, in response to the command/address signal CA received from the memory controller 100, the memory device 200 may store data received from the memory controller 100 or may send data stored therein to the memory controller 100.

Below, to describe embodiment of the present disclosure clearly, it is assumed that the memory device 200 is an LPDDR SDRAM device. However, the present disclosure is not limited thereto. For example, the memory device 200 may include various other types of memory devices, such as a DDR DRAM, without departing from the scope and spirit of the invention.

In an embodiment, the memory device 200 may identify the command/address signal CA received from the memory controller 100 based on the clock signal CK. The memory device 200 may identify data received from the memory controller 100 through the data signal DQ, based on the data clock signal WCK. The memory device 200 may send data to the memory controller 100 through the data signal DQ, based on the data clock signal WCK or the read data strobe signal RDQS.

In an embodiment, a frequency of the data clock signal WCK may be higher than a frequency of the clock signal CK. Due to a physical characteristic of an internal element of the memory device 200, the memory device 200 may divide and use the data clock signal WCK by a specific period. In this case, for the reliability of operation, a result of dividing the data clock signal WCK should be synchronized with the clock signal CK.

The memory controller 100 according to the present disclosure may not control the frequency of the clock signal CK for the synchronization with the data clock signal WCK. For example, in the initial driving of the data clock signal WCK, the memory controller 100 may drive the data clock signal WCK at a full-rate frequency (i.e., a target frequency) and may provide a synchronization pattern through at least one of data signals for the purpose of the synchronization between the data clock signal WCK and the clock signal CK. The memory device 200 may perform the synchronization between the data clock signal WCK and the clock signal CK by using the synchronization pattern. Accordingly, because the complexity of circuit for a frequency control of the data clock signal WCK in the memory controller 100 decreases and the timing necessary for synchronization is controlled, the overall performance of the memory system 10 may be improved. A configuration and an operation of the memory controller 100 and the memory device 200 according to an embodiment of the present disclosure will be described in detail with reference to the following drawings.

Figure 2:
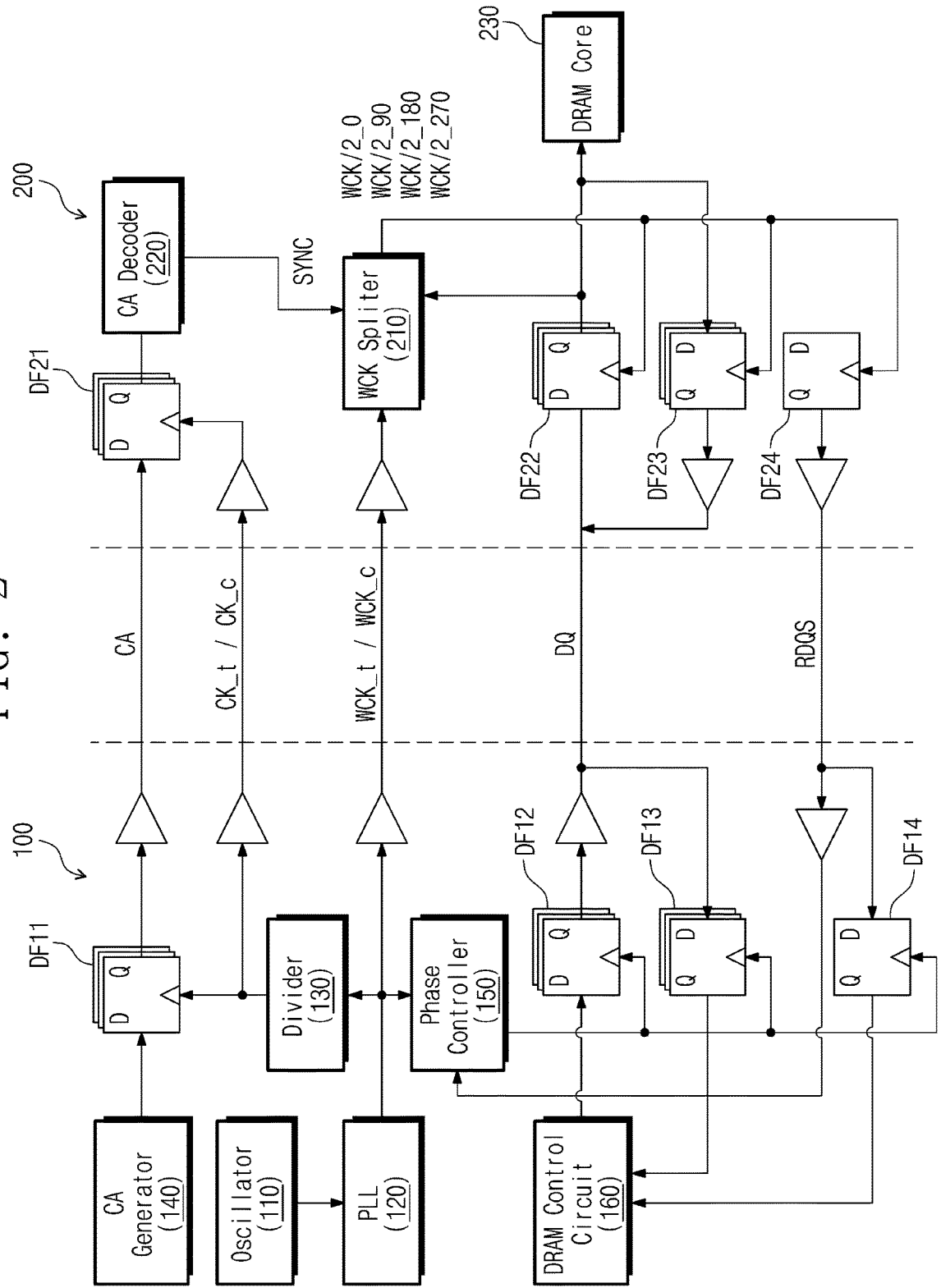
FIG. 2 is a block diagram illustrating a memory system of FIG. 1 in detail.

FIG. 2 is a block diagram illustrating a memory system of FIG. 1 in detail. A structure of an interface circuit for the signal transmission between the memory controller 100 and the memory device 200 will be described with reference to FIG. 2. Components illustrated in FIG. 2 may be some components of the memory controller 100 and the memory device 200, and each of the memory controller 100 and the memory device 200 may further include any other components.

Below, for convenience of description, reference signs CK, CK_t, CK_c, WCK, WCK_t, and WCK_c are used. The reference signs CK, CK_t, and CK_c represent clock signals (or a pair of differential clock signals), and the reference signs WCK, WCK_t, and WCK_c represent data clocks (or a pair of differential data clocks). In this case, the clock signal CK may be used as the concept including the clock signals CK_t and CK_c, and the clock signals CK_t and CK_c may be complementary. The clock signal WCK may be used as the concept including the clock signals WCK_t and WCK_c, and the clock signals WCK_t and WCK_c may be complementary. Below, for convenience of description and for brevity of drawing, each reference sign may be used interchangeably, but the present disclosure is not limited thereto. It will be easily understood by one skilled in the art.

Referring to FIGS. 1 and 2, the memory controller 100 may send the command/address signal CA, the clock signals CK_t and CK_c, and the data clock signals WCK_t and WCK_c to the memory device 200. The memory controller 100 and the memory device 200 may exchange the data signal DQ with each other. The memory device 200 may send the read data strobe signal RDQS to the memory controller 100.

For example, the memory controller 100 may include an oscillator 110, a phase locked loop (PLL) 120, a divider 130, a CA generator 140, a phase controller 150, a DRAM control circuit 160, a plurality of D-flip-flops DF11 to DF14, and a plurality of drivers. In an embodiment, each of the plurality of D-flip-flops DF11 to DF14 may operate as a signal receiver or a signal transmitter depending on a signal transmission/reception direction.

The oscillator 110 may generate a reference clock signal. The PLL 120 may receive the reference clock signal from the oscillator 110 and may control the reference clock signal to generate the data clock signals WCK_t and WCK_c. Below, to describe the present disclosure easily, it is assumed that a target frequency of the data clock signals WCK_t and WCK_c is 4.8 GHz. However, the present disclosure is not limited thereto. For example, the target frequency of the data clock signals WCK_t and WCK_c may be variously changed depending on a way to implement or the definition of the standard. The data clock signals WCK_t and WCK_c generated by the PLL 120 may be sent to the memory device 200 through a driver.

The divider 130 may divide the data clock signals WCK_t and WCK_c generated by the PLL 120 to generate the clock signals CK_t and CK_c. For example, the divider 130 may generate the clock signals CK_t and CK_c by dividing the data clock signals WCK_t and WCK_c to ½ times or ¼ times their frequency. The clock signals CK_t and CK_c generated from the divider 130 are provided to the memory device 200 through a driver.

The CA generator 140 may be configured to generate the command/address signal CA for controlling the memory device 200. The command/address signal CA may be input to the D-flip-flop DF11, and the D-flip-flop DF11 may output the command/address signal CA in synchronization with the clock signals CK_t and CK_c. The command/address signal CA output from the D-flip-flop DF11 is provided to the memory device 200 through a driver.

The phase controller 150 may be configured to control phases of the data clock signals WCK_t and WCK_c. For example, the data clock signals WCK_t and WCK_c may be used to send data to the memory device 200 or to receive data from the memory device 200. In this case, the phase controller 150 may control the phases of the data clock signals WCK_t and WCK_c such that data are normally exchanged.

The DRAM control circuit 160 may manage or generate data to be stored in the memory device 200. For example, the data generated from the DRAM control circuit 160 are input to the D-flip-flop DF12. The D-flip-flop DF12 may sequentially output the input data in response to the data clock signals WCK_t and WCK_c controlled by the phase controller 150. The data output from the D-flip-flop DF12 may be sent to the memory device 200 as the data signal DQ.

The DRAM control circuit 160 may manage data received from the memory device 200. For example, the data received from the memory device 200 through the data signal DQ are input to the D-flip-flop DF13. The D-flip-flop DF13 may sequentially output the input data in response to the data clock signals WCK_t and WCK_c controlled by the phase controller 150. The data output from the D-flip-flop DF13 may be provided to the DRAM control circuit 160.

In an embodiment, when the memory device 200 operates in an RDQS mode, the memory device 200 may send data to the memory controller 100 in synchronization with the read data strobe signal RDQS. In this case, the phase controller 150 may control the phase of the read data strobe signal RDQS received through a driver. The D-flip-flop DF13 may sequentially output the input data in synchronization with the read data strobe signal RDQS controlled by the phase controller 150. The data output from the D-flip-flop DF13 may be provided to the DRAM control circuit 160.

In an embodiment, the read data strobe signal RDQS is input to the D-flip-flop DF14. The D-flip-flop DF14 may output the input read data strobe signal RDQS in synchronization with the data clock signals WCK_t and WCK_c controlled by the phase controller 150. The DRAM control circuit 160 may perform error management based on the output of the D-flip-flop DF14.

The memory device 200 may include a data clock splitter 210, a CA decoder 220, a DRAM core 230, a plurality of D-flip-flops DF21 to DF24, and a plurality of drivers. The data clock splitter 210 may be configured to receive the data clock signals WCK_t and WCK_c from the memory controller 100 and to split the received data clock signals WCK_t and WCK_c. For example, the data clock splitter 210 may generate four split data clocks WCK/2_0, WCK/2_90, WCK/2_180, and WCK/2_270 based on the data clock signals WCK_t and WCK_c. A frequency of each of the four split data clocks WCK/2_0, WCK/2_90, WCK/2_180, and WCK/2_270 may be ½ times the frequency of the data clock signals WCK_t and WCK_c, and the four split data clocks WCK/2_0, WCK/2_90, WCK/2_180, and WCK/2_270 may have a phase difference of 90 degrees. In an embodiment, the data clock splitter 210 may synchronize the four split data clocks WCK/2_0, WCK/2_90, WCK/2_180, and WCK/2_270 and the clock signals CK_t and CK_c. In an embodiment, the data clock splitter 210 may perform synchronization based on a synchronization pattern received from the memory controller 100 through the data signal DQ. A synchronization operation of the data clock splitter 210 will be described in detail with reference to the following drawings.

The CA decoder 220 may be configured to decode the command/address signal CA received from the memory controller 100. For example, the command/address signal CA received from the memory controller 100 is input to the D-flip-flops DF21. The clock signals CK_t and CK_c received from the memory controller 100 are input to the D-flip-flops DF21 through a driver. The D-flip-flops DF21 sequentially output the command/address signal CA in synchronization with the clock signals CK_t and CK_c. The CA decoder 220 may decode the command/address signal CA output through the D-flip-flops DF21. In an embodiment, the CA decoder 220 may be configured to control the DRAM core 230 based on a decoding result. In an embodiment, the CA decoder 220 may generate a synchronization signal SYNC in response to a specific command (e.g., CAS WS=1). In an embodiment, the synchronization signal SYNC may be generated in synchronization with the clock signals CK_t and CK_c. The synchronization signal SYNC may be provided to the data clock splitter 210, and the data clock splitter 210 may perform a synchronization operation in response to the synchronization signal SYNC.

The DRAM core 230 may be configured to store data received from the memory controller 100 or to output data stored therein. For example, the data received from the memory controller 100 through the data signal DQ are input to the D-flip-flops DF22. The D-flip-flops DF22 sequentially output the input data in synchronization with the four split data clocks WCK/2_0, WCK/2_90, WCK/2_180, and WCK/2_270 generated by the data clock splitter 210. The data output from the D-flip-flops DF22 may be stored in memory cells by the DRAM core 230. In an embodiment, the D-flip-flops DF22 may be a reception circuit configured to receive write data from the memory controller 100.

Alternatively, the data stored in the DRAM core 230 may be input to the D-flip-flops DF23. The D-flip-flops DF23 sequentially output the input data in synchronization with the four split data clocks WCK/2_0, WCK/2_90, WCK/2_180, and WCK/2_270 generated by the data clock splitter 210. The data output from the D-flip-flops DF23 may be sent to the memory controller 100 through a driver as the data signal DQ. In an embodiment, the D-flip-flops DF23 may be a transmission circuit configured to send the read data to the memory controller 100.

In an embodiment, when the memory device 200 operates in the RDQS mode, the memory device 200 may send the read data strobe signal RDQS to the memory controller 100. For example, the D-flip-flops DF24 may operate in synchronization with the four split data clocks WCK/2_0, WCK/2_90, WCK/2_180, and WCK/2_270 generated by the data clock splitter 210. The data output from the D-flip-flops DF24 are sent to the memory controller 100 through a driver as the read data strobe signal RDQS.

Figure 3:
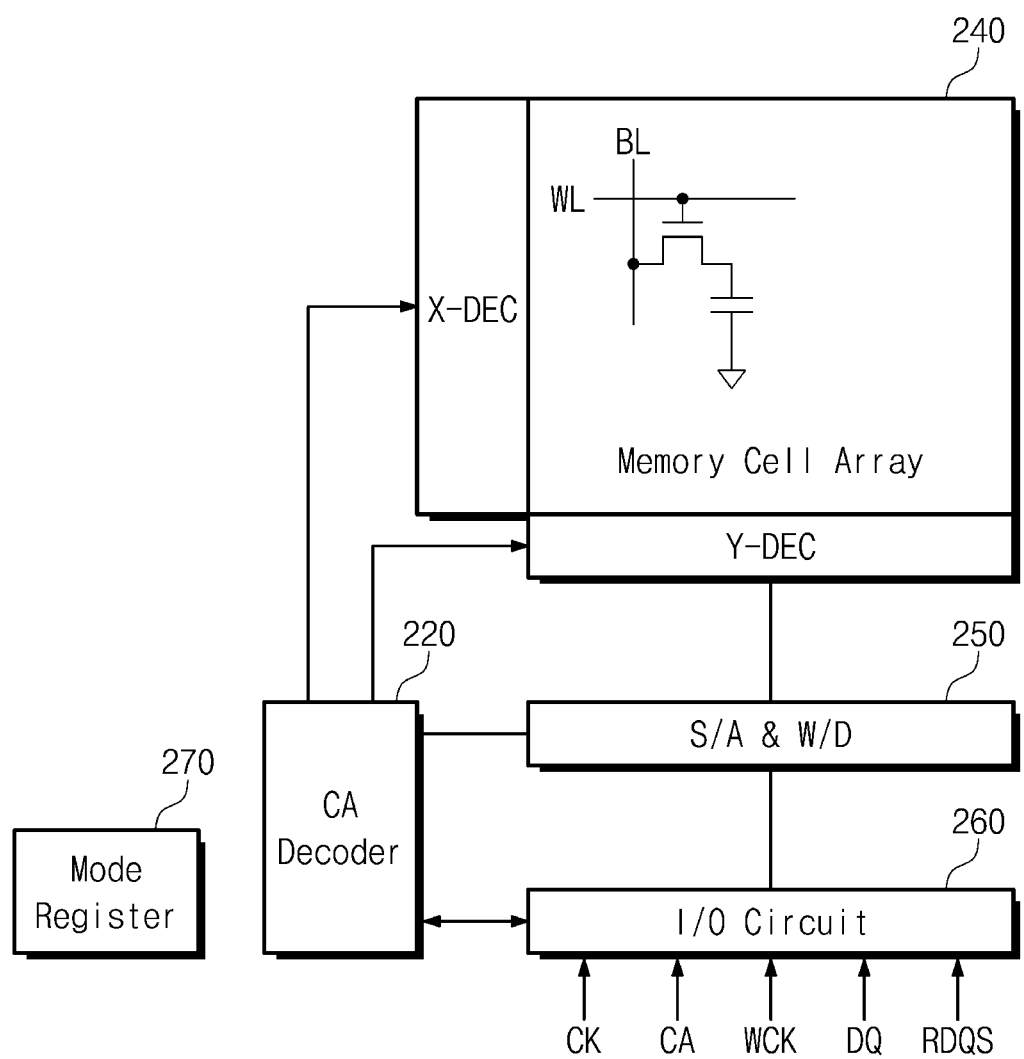
FIG. 3 is a block diagram illustrating a memory device of FIG. 2.

FIG. 3 is a block diagram illustrating a memory device of FIG. 2. In an embodiment, the structure of the interface for the signal transmission between the memory controller 100 and the memory device 200 is mainly described with reference to FIG. 2. A structure of the memory device 200 will be described in detail with reference to FIG. 3.

Referring to FIGS. 1 to 3, the memory device 200 may include the CA decoder 220, a memory cell array 240, a sense amplifier and write driver 250, an input/output circuit 260, and a mode register 270. The CA decoder 220 may decode the command/address signal CA received from the memory controller 100. The CA decoder 220 may control the components of the memory device 200 based on a decoding result. The memory cell array 240 may include a plurality of memory cells. Each of the plurality of memory cells may be connected with a word line WL and a bit line BL. In an embodiment, each of the plurality of memory cells may be a DRAM cell. For example, each of the plurality of memory cells may include a storage capacitor and a select transistor connected between the storage capacitor and a bit line. The select transistor may operate in response to a voltage of a word line. A row decoder X-DEC may be connected with the memory cell array 240 through a plurality of word lines WL and may drive the plurality of word lines WL under control of the CA decoder 220. A column decoder Y-DEC may be connected with a plurality of bit lines BL and may select the plurality of bit lines BL under control of the CA decoder 220. Under control of the CA decoder 220, the sense amplifier and write driver 250 may control voltages of a plurality of bit lines or may sense voltage changes of the plurality of bit lines.

The input/output circuit 260 may receive the clock signal CK, the command/address signal CA, and the data clock signal WCK from the memory controller 100. The input/output circuit 260 may exchange data with the memory controller 100 through the data signal DQ. The input/output circuit 260 may send the read data strobe signal RDQS to the memory controller 100. The mode register 270 may be configured to store a variety of information necessary for the memory device 200 to operate. In an embodiment, the mode register 270 may be set by the memory controller 100 or may be set by the memory device 200.

In an embodiment, some (e.g., the data clock splitter 210, the D-flip-flops DF21 to DF24, and the drivers) of the components described with reference to FIG. 2 may be included in the input/output circuit 260. In another embodiment, some (e.g., the memory cell array 240, the row decoder X-DEC, the column decoder Y-DEC, the sense amplifier and write driver 250, and the mode register 270) of the components described with reference to FIG. 3 may be included in the DRAM core 230 described with reference to FIG. 2.

Figure 4A:
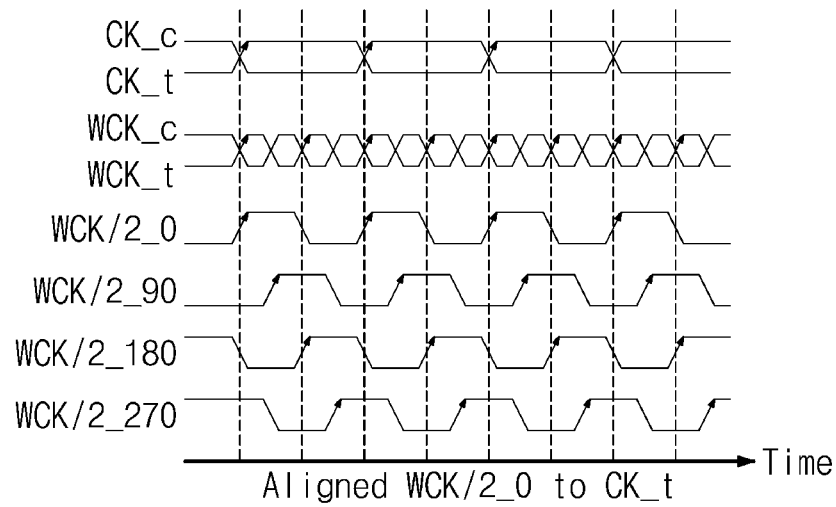
FIGS. 4A and 4B are timing diagrams for describing how a data clock signal and a clock signal are synchronized.
Figure 4B:
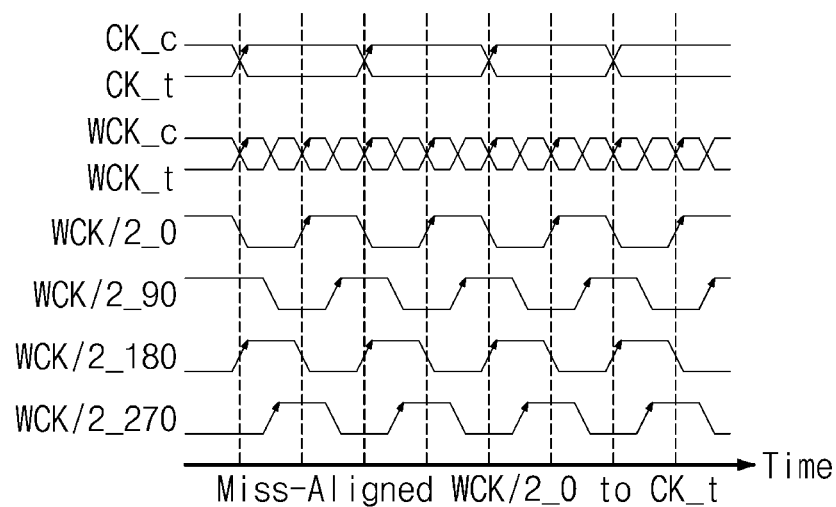

FIGS. 4A and 4B are timing diagrams for describing how a data clock signal and a clock signal are synchronized. In an embodiment, the frequency of the data clock signals WCK_t and WCK_c may be 2 times or 4 times the frequency of the clock signals CK_t and CK_c. That is, because the frequency of the data clock signals WCK_t and WCK_c is relatively high, for the reliability of an internal operation, the memory device 200 divides or splits the data clock signals WCK_t and WCK_c and performs the internal operation. In this case, the split data clocks should be aligned with the clock signals CK_t and CK_c.

For example, referring to FIGS. 1, 2, 4A, and 4B, the frequency of the data clock signals WCK_t and WCK_c may be 4 times the frequency of the clock signals CK_t and CK_c. In this case, the data clock splitter 210 of the memory device 200 may split the data clock signals WCK_t and WCK_c to generate the split data clocks WCK/2_0, WCK/2_90, WCK/2_180, and WCK/2_270. The frequency of each of the split data clocks WCK/2_0, WCK/2_90, WCK/2_180, and WCK/2_270 may be ½ times the frequency of the data clock signals WCK_t and WCK_c, and the split data clocks WCK/2_0, WCK/2_90, WCK/2_180, and WCK/2_270 have a phase difference of 90 degrees.

In this case, that a rising edge of the split data clock signal WCK/2_0 is aligned with a rising edge of the clock signal CK_t (or a falling edge of the clock signal CK_c) means that the split data clock signal WCK/2_0 is aligned or synchronized with the clock signals CK_t and CK_c. In this case, the memory device 200 may normally perform the internal operation by using the split data clocks WCK/2_0, WCK/2_90, WCK/2_180, and WCK/2_270.

In contrast, as illustrated in FIG. 4B, that the rising edge of the split data clock signal WCK/2_0 is not aligned with the rising edge of the clock signal CK_t (or the falling edge of the clock signal CK_c) means that the split data clock signal WCK/2_0 is misaligned or not synchronized with the clock signals CK_t and CK_c. In this case, the memory device 200 may fail to normally perform the internal operation by using the split data clocks WCK/2_0, WCK/2_90, WCK/2_180, and WCK/2_270. That is, for the memory device 200 to normally perform the internal operation by using the split data clocks WCK/2_0, WCK/2_90, WCK/2_180, and WCK/2_270, there is a need to align or synchronize the split data clocks WCK/2_0, WCK/2_90, WCK/2_180, and WCK/2_270 with the clock signals CK_t and CK_c.

Figure 5:
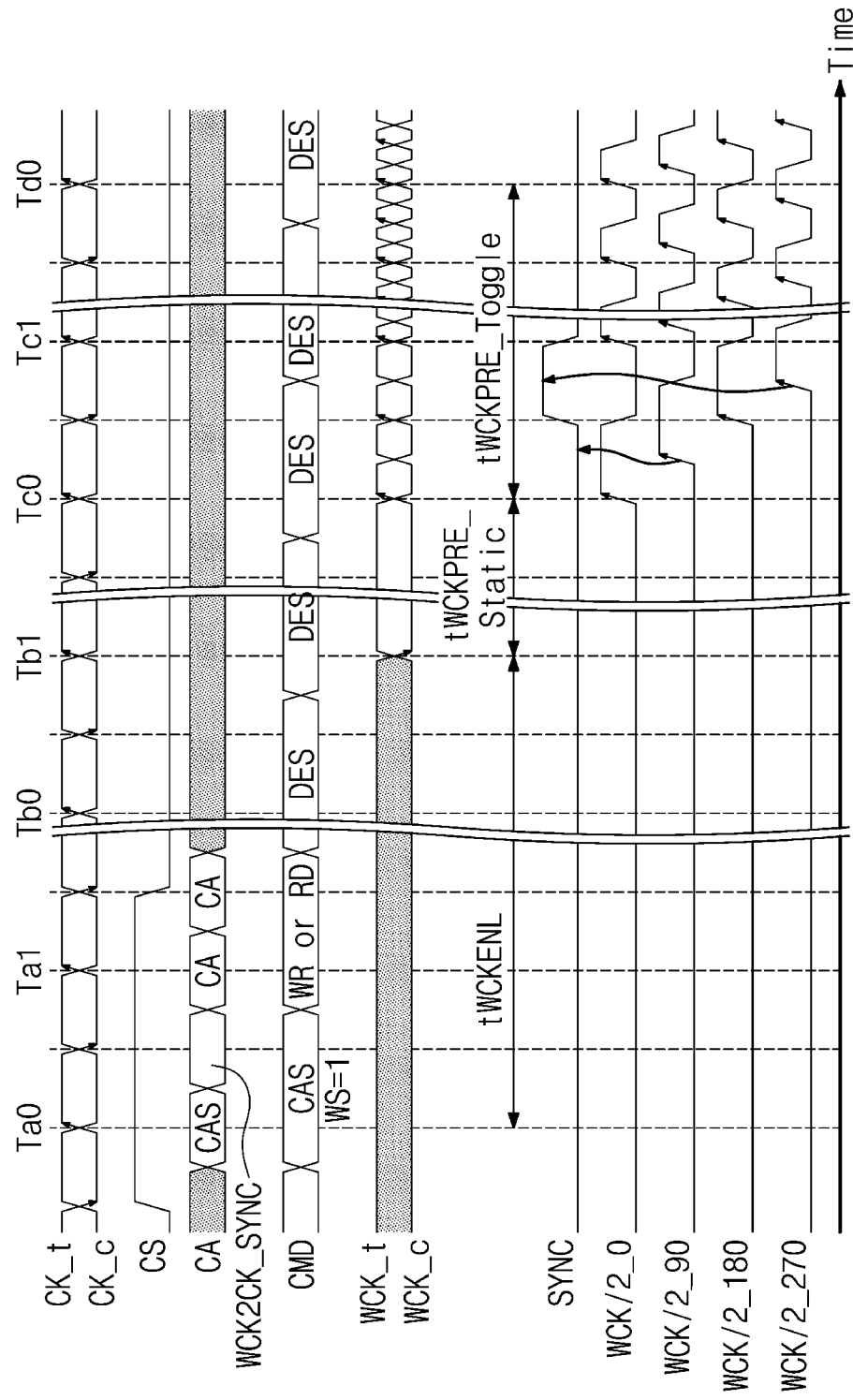
FIG. 5 is a timing diagram for describing how a data clock signal and a clock signal are synchronized.

FIG. 5 is a timing diagram for describing how a data clock signal and a clock signal are synchronized. Referring to FIGS. 1, 2, and 5, the memory controller 100 may send the clock signals CK_t and CK_c to the memory device 200. The memory controller 100 may also send a CAS command and a read or write command WR or RD to the memory device 200 in synchronization with the clock signals CK_t and CK_c. For example, as shown in Table 1 below, the memory controller 100 may send the CAS command to the memory device 200.

TABLE 1

| CMD | CS | CA0 | CA1 | CA2 | CA3 | CA4 | CA5 | CA6 | CK_t |
|-----|----|----|----|----|----|------|-------|-------|------|
| CAS | H  | L   | L   | H   | H   | WS_WR | WS_RD | WS_FS | R1   |
|     | X  | DC0 | DC1 | DC2 | DC3 | WRX  | V     | B3    | F1   |

As shown in Table 1 above, during a time interval when a chip select signal CS is at the high level (H), the memory controller 100 sends a first CAS command set to the memory device 200 in synchronization with the rising edge R1 of the clock signal CK_t (i.e., time point Ta0), and sends a second CAS command set to the memory device 200 in synchronization with the next falling edge F1 of the clock signal CK_t. In an embodiment, WS_WR, WS_RD, and WS_FS represent operands designating the synchronization WCK2CK_SYNC of the data clock signal WCK for respective operations, and B3 and WRX represent operands designated together with the synchronization WCK2CK_SYNC. That is, when the synchronization WCK2CK_SYNC is performed on the data clock signal WCK, one of WS_WR, WS_RD, and WS_FS may be set to the high level.

Afterwards, the memory controller 100 may send the column addresses CA as operation commands (e.g., WR or RD) at the rising edge (i.e., time point Ta1) and the next falling edge of the clock signal CK_t. After a time point when tWCKENL passes from a time point (i.e., Ta0) at which the first CAS command set is sent, the memory controller 100 may start the toggling of the data clock signals WCK_t and WCK_c. In this case, in an initial period where the data clock signals WCK_t and WCK_c toggle, during a time of tWCKPRE_Static, the data clock signals WCK_t and WCK_c maintain the low level and the high level, respectively.

Afterwards, during a time of tWCKPRE_Toggle, the memory controller 100 may allow the data clock signals WCK_t and WCK_c to toggle. In this case, in an initial period of the time of tWCKPRE_Toggle, during one cycle of the clock signals CK_t and CK_c, the data clock signals WCK_t and WCK_c toggle with a half-rate frequency and then toggle with a target frequency.

After a time of tWCKPRE_Static (i.e., after time point Tc0), the memory device 200 may perform synchronization on the data clock signals WCK_t and WCK_c. For example, the memory device 200 may split the data clock signals WCK_t and WCK_c into the four split data clocks WCK/2_0, WCK/2_90, WCK/2_180, and WCK/2_270. While the data clock signals WCK_t and WCK_c toggle with the half-rate frequency, the memory device 200 may generate the synchronization signal SYNC and may sample the synchronization signal SYNC at the rising edges of the split data clocks WCK/2_90 and WCK/2_270 among the four split data clocks WCK/2_0, WCK/2_90, WCK/2_180, and WCK/2_270. In an embodiment, the synchronization signal SYNC may be generated in synchronization with the clock signals CK_t and CK_c.

The memory device 200 may determine whether the data clock signals WCK_t and WCK_c are aligned with the clock signals CK_t and CK_c, based on a sampling result. For example, as illustrated in FIG. 5, when the data clock signals WCK_t and WCK_c are aligned with the clock signals CK_t and CK_c, a value that is obtained by sampling the synchronization signal SYNC based on the split data clock WCK/2_90 may correspond to the low level, and a value that is obtained by sampling the synchronization signal SYNC based on the split data clock WCK/2_270 may correspond to the high level.

In contrast, when the data clock signals WCK_t and WCK_c are not aligned with the clock signals CK_t and CK_c, a value that is obtained by sampling the synchronization signal SYNC based on the split data clock WCK/2_90 may correspond to the high level, and a value that is obtained by sampling the synchronization signal SYNC based on the split data clock WCK/2_270 may correspond to the low level. When the data clock signals WCK_t and WCK_c are not aligned with the clock signals CK_t and CK_c, the memory device 200 may normally perform the internal operation by swapping the split data clocks WCK/2_0 and WCK/2_90 with the split data clocks WCK/2_180 and WCK/2_270.

In an embodiment, the synchronization operation of the data clock signals WCK_t and WCK_c described with reference to FIG. 5 may be an operation defined by the LPDDR5 standard. As described with reference to FIG. 5, a time of "tWCKENL+tWCKPRE_Static" is required from a time point at which the memory controller 100 sends the CAS command to a time point at which the synchronization operation (i.e., WCK2CK_SYNC) of the data clock signals WCK_t and WCK_c is performed. Also, for the synchronization operation (i.e., WCK2CK_SYNC) of the data clock signals WCK_t and WCK_c, the data clock signals WCK_t and WCK_c should toggle with the half-rate frequency. The above time delay and the control of the data clock signals WCK_t and WCK_c causes a decrease in an operating speed of the memory system 10 and an increase in the complexity of circuit necessary to drive the data clock signals WCK_t and WCK_c.

Figure 6:
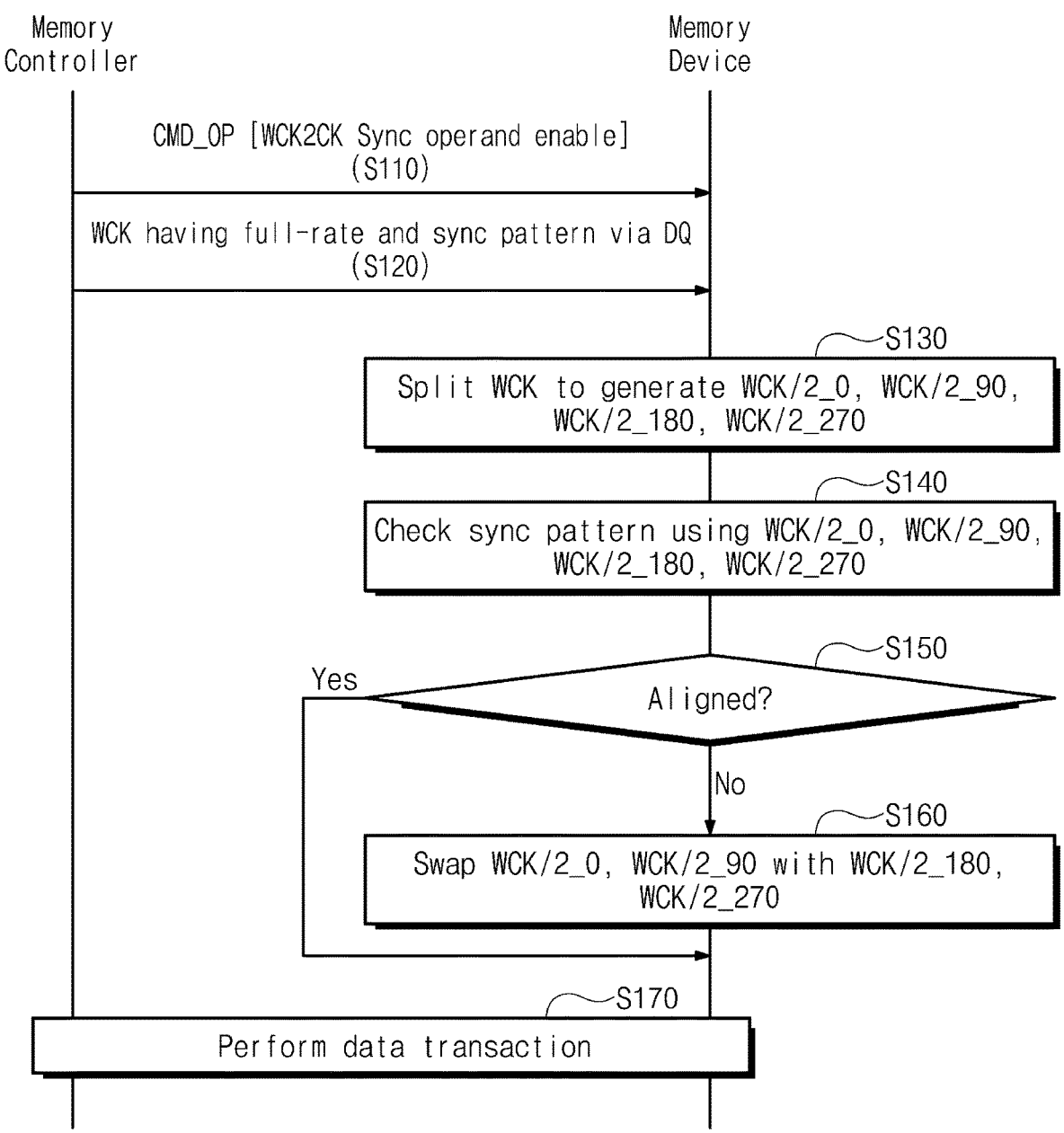
FIG. 6 is a flowchart illustrating an operation of a memory system of FIG. 1.

An operation method of the memory controller 100 and the memory device 200 according to an embodiment of the present disclosure will be described in detail with reference to the following drawings. FIG. 6 is a flowchart illustrating an operation of a memory system of FIG. 1. Referring to FIGS. 1 and 6, in operation S110, the memory controller 100 may send an operation command CMD_OP to the memory device 200.

For example, the operation command CMD_OP may be the CAS command set and the write command WR or the read command RD described with reference to FIG. 5. In an embodiment, the operand WCK2CK_SYNC of the CAS command may be enabled. That is, one of WS_WR, WS_RD, and WS_FS may be set to the high level.

In operation S120, the memory controller 100 may send the data clock signal WCK having the full-rate frequency to the memory device 200. At the same time, the memory controller 100 may send the synchronization pattern to the memory device 200 through the data signal DQ. For example, as described with reference to FIG. 5, without controlling the frequency of the data clock signals WCK_t and WCK_c, the memory controller 100 may send the data clock signals WCK_t and WCK_c having the full-rate frequency (i.e., the target frequency) and may simultaneously send the synchronization pattern through at least one of a plurality of data signals DQ.

In operation S130, the memory device 200 may split the data clock signals WCK_t and WCK_c to generate the four split data clocks WCK/2_0, WCK/2_90, WCK/2_180, and WCK/2_270. In operation S140, the memory device 200 may check or sample the synchronization pattern received through the at least data signal DQ by using the four split data clocks WCK/2_0, WCK/2_90, WCK/2_180, and WCK/2_270.

In operation S150, the memory device 200 may determine whether the data clock signals WCK_t and WCK_c are aligned with the clock signals CK_t and CK_c, based on a checking result or a sampling result. For example, when the checking or sampling result in operation S140 corresponds to a given synchronization pattern, it may mean that the data clock signals WCK_t and WCK_c are aligned with the clock signals CK_t and CK_c.

When the checking or sampling result in operation S140 does not correspond to the given synchronization pattern, it may mean that the data clock signals WCK_t and WCK_c are misaligned with the clock signals CK_t and CK_c. In this case (i.e., in the case of "No" in operation S150), in operation S160, the memory device 200 may swap the split data clocks WCK/2_0 and WCK/2_90 with the split data clocks WCK/2_180 and WCK/2_270. Afterwards, in operation S170, the memory device 200 may perform the internal operation by using the split data clocks and may exchange data with the memory controller 100.

As described above, according to the embodiment of FIG. 6, the memory device 200 may perform the synchronization operation WCK2CK_SYNC of the data clock signal WCK based on the synchronization pattern received through at least one data signal DQ. In this case, because there is no need to change the frequency of the data clock signal WCK for the purpose of the synchronization operation, a time point of the synchronization operation may become faster. Accordingly, the overall latency of the memory device 200 may decrease. Moreover, because there is no need to change the frequency of the data clock signal WCK, the complexity of circuit necessary for the memory controller 100 to drive the data clock signal WCK may decrease.

Figure 7:
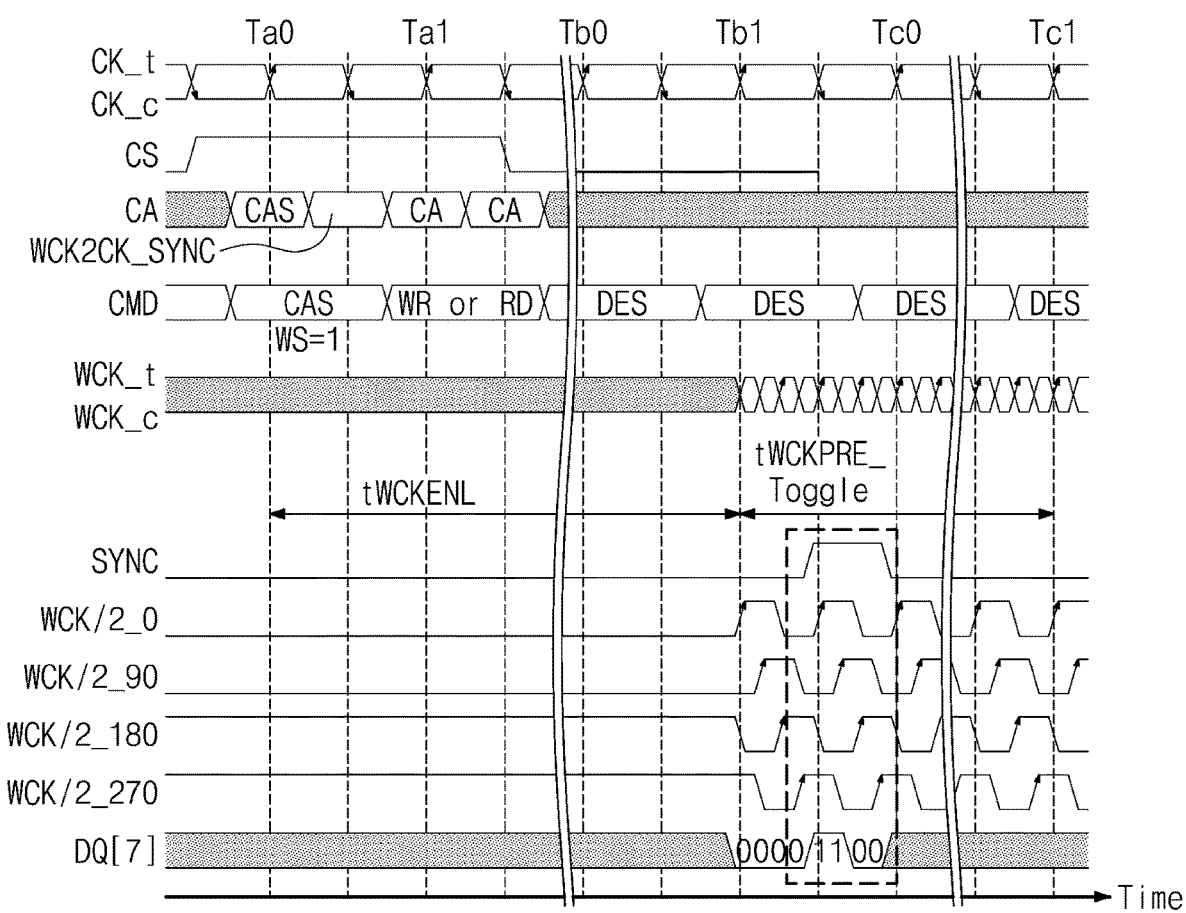
FIG. 7 is a timing diagram for describing an operation of a memory system according to the flowchart of FIG. 6.

FIG. 7 is a timing diagram for describing an operation of a memory system according to the flowchart of FIG. 6. For convenience of description, additional description associated with the components described above will be omitted to avoid redundancy. Below, reference signs representing delay times of tWCKENL and tWCKPRE_Toggle are used. The reference sign tWCKENL may represent a delay time necessary for the memory device 200 to prepare the synchronization operation of the data clock signal WCK. The reference sign tWCKPRE_Toggle may represent a delay time from a time point at which the data clock signal WCK starts to toggle to a time point at which the data transmission/reception is actually made. However, the reference signs are not intended to limit the scope and spirit of the invention, and the terms and reference signs may be easily understood by one skilled in the art.

Referring to FIGS. 1, 6, and 7, the memory controller 100 may send the CAS command and the operation command (e.g., WR or RD) to the memory device 200. In an embodiment, the CAS command may include an operand or information indicating the synchronization operation of the data clock signal WCK. The CAS command and the operation command (e.g., WR or RD) are described with reference to FIG. 5, and thus, additional description will be omitted to avoid redundancy.

After the time of tWCKENL passes from a time point (i.e., time point Ta0) at which the CAS command is sent, the memory controller 100 may send the data clock signals WCK_t and WCK_c to the memory device 200. In this case, unlike the description given with reference to FIG. 5, the memory controller 100 sends the data clock signals WCK_t and WCK_c having the full-rate frequency (i.e., the target frequency) to the memory device 200. That is, in the embodiment of FIG. 7, the memory controller 100 may directly send the data clock signals WCK_t and WCK_c having the full-rate frequency without changing or dividing the data clock signals WCK_t and WCK_c. In this case, compared to the configuration of FIG. 5, the time of tWCKPRE_Static may decrease or may be removed.

The memory controller 100 may send the data clock signals WCK_t and WCK_c to the memory device 200 and may simultaneously send the synchronization pattern through the specific data signal DQ. For example, while the memory controller 100 sends the data clock signals WCK_t and WCK_c to the memory device 200, the memory controller 100 may send the synchronization pattern of "00001100" to the memory device 200 through a seventh data signal DQ[7].

The memory device 200 may generate the four split data clocks WCK/2_0, WCK/2_90, WCK/2_180, and WCK/2_270 based on the data clock signals WCK_t and WCK_c having the full-rate frequency. In a period where the synchronization signal SYNC is at the high level, the memory device 200 may identify at least a part of the synchronization signal of "00001100" received through the seventh data signal DQ[7] by using the four split data clocks WCK/2_0, WCK/2_90, WCK/2_180, and WCK/2_270.

The memory device 200 may determine whether the data clock signal WCK is aligned with the clock signal CK (i.e., whether the data clock signal WCK is in an alignment state), based on the identified pattern. For example, as illustrated in FIG. 7, when the synchronization pattern is "00001100" and the synchronization signal SYNC has the high level with respect to four lowermost bits (i.e., 1100) of the synchronization pattern, "1" may be identified based on the split data clock WCK/2_0, "1" may be identified based on the split data clock WCK/2_90, "0" may be identified based on the split data clock WCK/2_180, and "0" may be identified based on the split data clock WCK/2_270. In other words, "1", "1", "0", and "0" are respectively identified by the four split data clocks WCK/2_0, WCK/2_90, WCK/2_180, and WCK/2_270. In this case, because the identified value (i.e., 1100) corresponds to four lower bits of the synchronization pattern, the memory device 200 determines that the data clock signal WCK is in the alignment state.

In contrast, although not illustrated in drawing, when the data clock signal WCK is in a misalignment state, "0" may be identified based on the split data clock WCK/2_0, "0" may be identified based on the split data clock WCK/2_90, "1" may be identified based on the split data clock WCK/2_180, and "1" may be identified based on the split data clock WCK/2_270. In other words, "0", "0", "1", and "1" are respectively identified by the four split data clocks WCK/2_0, WCK/2_90, WCK/2_180, and WCK/2_270, and the identified values may be different from the four lower bits of the synchronization pattern. In this case, the memory device 200 may swap the split data clocks WCK/2_0 and WCK/2_90 with the split data clocks WCK/2_180 and WCK/2_270. And, in an embodiment, after the time of tWCKPRE_Toggle passes from a time point (i.e., time point Tb1) at which the transmission of the data clock signals WCK_t and WCK_c starts, the memory device 200 may exchange data with the memory controller 100 by using the split data clocks WCK/2_180 and WCK/2_270.

An embodiment in which the synchronization pattern is sent through the seventh data signal DQ[7] is described with reference to FIG. 7, but the present disclosure is not limited thereto. For example, the synchronization pattern may be sent through at least one of the plurality of data signals. Alternatively, the synchronization pattern may be sent through signal lines that are driven in synchronization with the data clock signal.

In an embodiment, various operation information, which is necessary for the synchronization operation according to an embodiment of the present disclosure, such as whether to send the synchronization pattern through any data signal, a type of the synchronization pattern, the timing to generate the synchronization signal, the latency of each operation may be determined by the standard or protocol defined between the memory controller 100 and the memory device 200. In an embodiment, the various operation information for the synchronization operation may be stored in the mode register 270 of the memory device 200 by the memory controller 100.

In an embodiment, the synchronization operation of the data clock signals WCK_t and WCK_c may be performed when the data clock signals WCK_t and WCK_c are turned off and is then again driven. In an embodiment, when the data clock signals WCK_t and WCK_c are continuously driven, the synchronization operation of the data clock signals WCK_t and WCK_c may be omitted.

Figure 8:
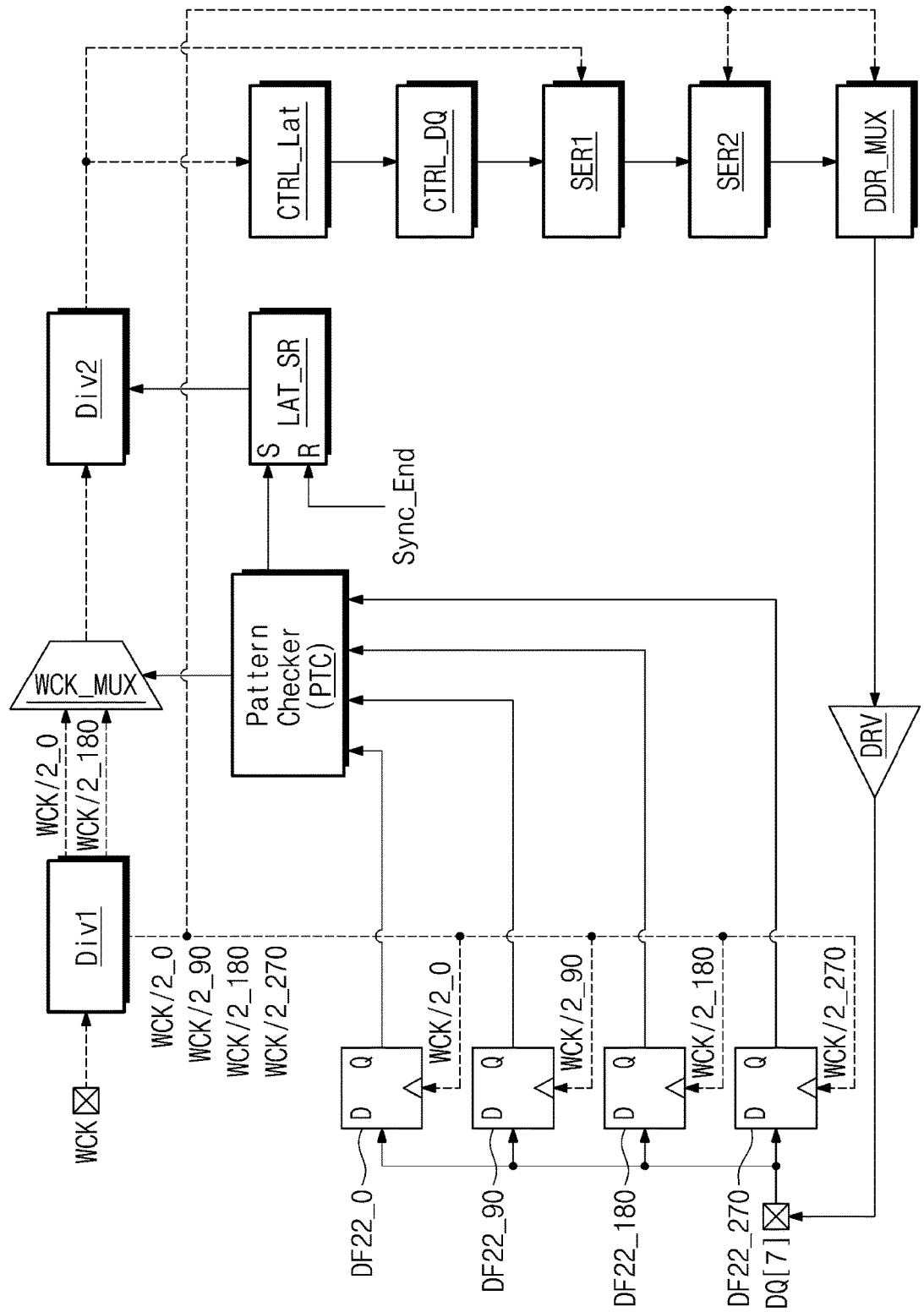
FIG. 8 is a diagram for describing a synchronization operation of a data clock signal according to the timing diagram of FIG. 7.

Referring now to FIG. 8, a synchronization operation of a data clock signal according to the timing diagram of FIG. 7 will be described. Referring to FIGS. 1, 2, 7, and 8, the memory device 200 may receive the data clock signal WCK from the memory controller 100. The data clock signal WCK may be split into the four split data clocks WCK/2_0, WCK/2_90, WCK/2_180, and WCK/2_270 by a first divider Div1. The frequency of each of the four split data clocks WCK/2_0, WCK/2_90, WCK/2_180, and WCK/2_270 may be ½ times the frequency of the data clock signals WCK_t and WCK_c, and the four split data clocks WCK/2_0, WCK/2_90, WCK/2_180, and WCK/2_270 may have a phase difference of 90 degrees.

The memory device 200 may receive the synchronization pattern through the pin associated with the seventh data signal DQ[7]. The seventh data signal DQ[7] is provided to D-flip-flops DF22_0, DF22_90, DF22_180, and DF22_270. The D-flip-flops DF22_0, DF22_90, DF22_180, and DF22_270 may sequentially output signals input thereto by using the four split data clocks WCK/2_0, WCK/2_90, WCK/2_180, and WCK/2_270. For example, the D-flip-flop DF22_0 outputs the input data in response to the rising edge of the split data clock WCK/2_0. The D-flip-flop DF22_90 outputs the input data in response to the rising edge of the split data clock WCK/2_90. The D-flip-flop DF22_180 outputs the input data in response to the rising edge of the split data clock WCK/2_180. The D-flip-flop DF22_270 outputs the input data in response to the rising edge of the split data clock WCK/2_270.

A pattern checker PTC may receive outputs of the D-flip-flops DF22_0, DF22_90, DF22_180, and DF22_270. The pattern checker PTC may identify output values of the D-flip-flops DF22_0, DF22_90, DF22_180, and DF22_270 during the high period of the synchronization signal SYNC. The pattern checker PTC may compare the identified values with the synchronization pattern.

The pattern checker PTC may control a data clock multiplexer WCK_MUX based on a comparison result. For example, the data clock multiplexer WCK_MUX may receive the two split data clocks WCK/2_0 and WCK/2_180 from the first divider Div1. The data clock multiplexer WCK_MUX may output one of the two split data clocks WCK/2_0 and WCK/2_180 under control of the pattern checker PTC.

Advantageously, whenever the values identified by the pattern checker PTC coincide with or correspond to at least a part of the synchronization pattern, the data clock signal WCK will be treated as in an alignment state. In this case, the data clock multiplexer WCK_MUX selects and outputs the split data clock WCK/2_0 under control of the pattern checker PTC. Alternatively, when the values identified by the pattern checker PTC do not coincide with or do not correspond to at least a part of the synchronization pattern, then the data clock signal WCK will be treated as in a misalignment state. In this case, the data clock multiplexer WCK_MUX selects and outputs the split data clock WCK/2_180 under control of the pattern checker PTC.

The output of the data clock multiplexer WCK_MUX is provided to a second divider Div2. The second divider Div2 may divide the frequency of the input data clock by 2 in response to an output of an SR latch LAT_SR. For example, the SR latch LAT_SR may be set by the pattern checker PTC and may be reset by a synchronization end signal Sync_End. The second divider Div2 may divide the input data clock in response to the SR latch LAT_SR being set. A clock signal output from the second divider Div2 is provided to a latency control circuit CTRL_Lat and a first serializer SER1.

The latency control circuit CTRL_Lat may perform latency control on a data clock domain based on the clock signal output from the second divider Div2. A DQ control circuit CTRL_DQ may operate under control of the latency control circuit CTRL_Lat. The first serializer SER1 may receive data "DATA" from the DRAM core 230 and may serialize the data "DATA" in synchronization with the clock signal output from the second divider Div2. A second serializer SER2 may serialize the data output from the first serializer SER1 in synchronization with the four split data clocks WCK/2_0, WCK/2_90, WCK/2_180, and WCK/2_270. A DDR multiplexer DDR_MUX may sequentially output the data output from the second serializer SER2 in synchronization with the four split data clocks WCK/2_0, WCK/2_90, WCK/2_180, and WCK/2_270. The data output from the DDR multiplexer DDR_MUX may be output as the seventh data signal DQ[7] through a driver DRV. As will be understood by those skilled in the art, the configuration described with reference to FIG. 8 is associated with some of the operations of the memory device 200, and the present disclosure is not limited thereto.

As described above, the memory device 200 may perform synchronization on the data clock signal WCK based on the synchronization pattern received through a specific data signal. In this case, compared to the conventional synchronization manner (e.g., the configuration of FIG. 5), a separate sampler for sampling the synchronization signal SYNC may not be required, and the synchronization of the data clock signal WCK may be quickly performed.

Figure 9:
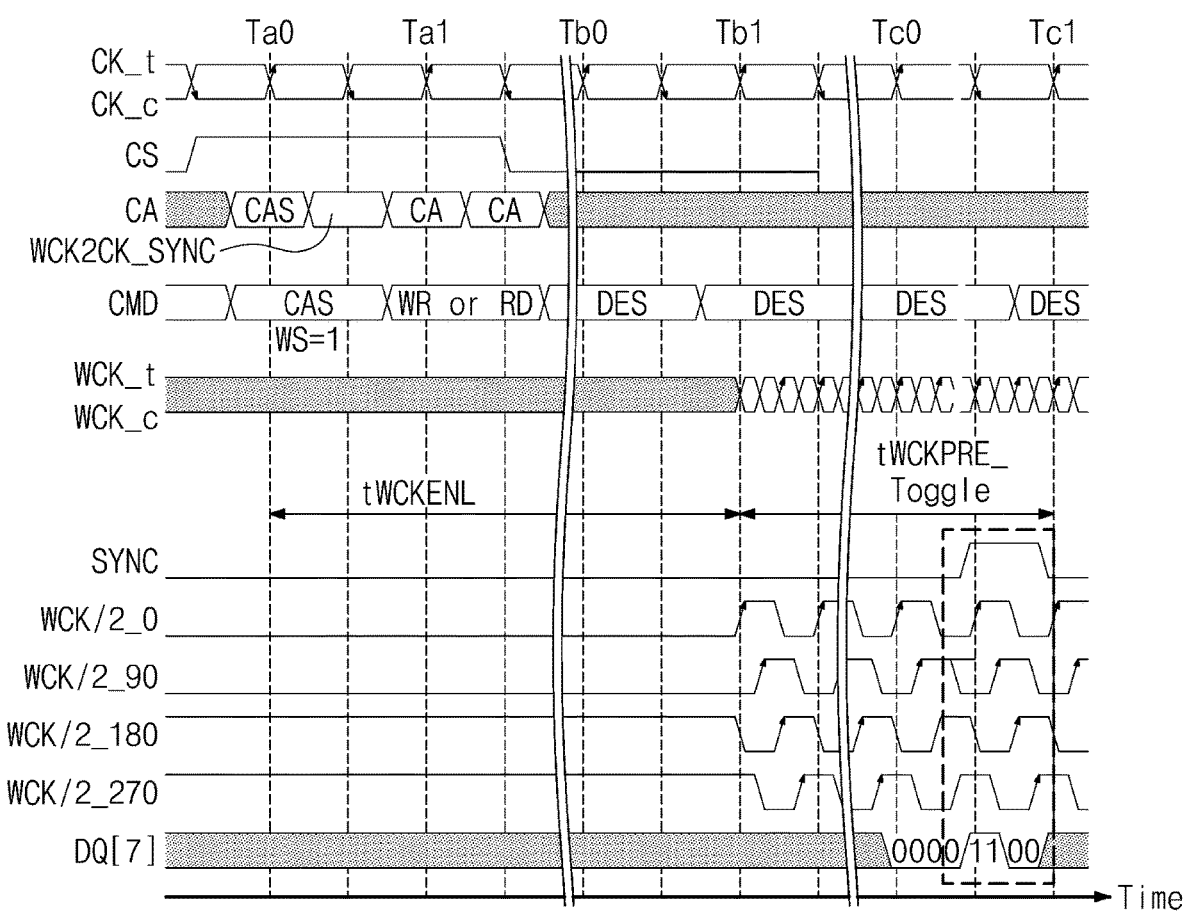
FIG. 9 is a timing diagram for describing an operation of a memory system of FIG. 1.

FIG. 9 is a timing diagram for describing an operation of a memory system of FIG. 1. For convenience of description, additional description associated with the components described above will be omitted to avoid redundancy. Referring to FIGS. 1, 7, and 9, the memory controller 100 may send the CAS command and the operation command (e.g., WR or RD) to the memory device 200. In an embodiment, the CAS command may include an operand or information indicating the synchronization operation of the data clock signal WCK. The CAS command and the operation command (e.g., WR or RD) are described with reference to FIG. 5, and thus, additional description will be omitted to avoid redundancy.

After the time of tWCKENL passes from a time point (i.e., time point Ta0) at which the CAS command is sent, the memory controller 100 sends the data clock signals WCK_t and WCK_c having the full-rate frequency (i.e., the target frequency) to the memory device 200. This is described with reference to FIG. 7, and thus, additional description will be omitted to avoid redundancy.

In the embodiment of FIG. 7, the memory controller 100 sends the data clock signals WCK_t and WCK_c and simultaneously sends the synchronization pattern through a specific data signal (e.g., DQ[7]). In contrast, in the embodiment of FIG. 9, after a given time passes from a time point (e.g., time point Tb1) at which the transmission of the data clock signals WCK_t and WCK_c starts (e.g., after "n" cycles of the clock signals CK_t and CK_c), the memory controller 100 sends the synchronization pattern through the specific data signal (e.g., DQ[7]). The embodiment of FIG. 9 is substantially the same as the embodiment of FIG. 7 except that transmission time points of the synchronization pattern are different, and thus, additional description associated with the remaining operations will be omitted to avoid redundancy.

In an embodiment, the timing to send the synchronization pattern may be separately defined between the memory controller 100 and the memory device 200, and information about the timing to send the synchronization pattern may be set in the mode register 270. The memory device 200 may generate the synchronization signal SYNC based on the information set in the mode register 270. For example, the memory device 200 may generate the synchronization signal SYNC in synchronization with the clock signals CK_t and CK_c, based on the timing to receive the synchronization pattern.

In an embodiment, the memory device 200 may generate the synchronization signal SYNC based on a specific data signal through which the synchronization pattern is received. For example, when the data clock signals WCK_t and WCK_c are received, the memory device 200 may monitor the seventh data signal DQ[7]. The memory device 200 may generate the synchronization signal SYNC in response to that a specific pattern (e.g., "0000" corresponding to four upper bits of the synchronization pattern) is detected from the seventh data signal DQ[7].

Figure 10:
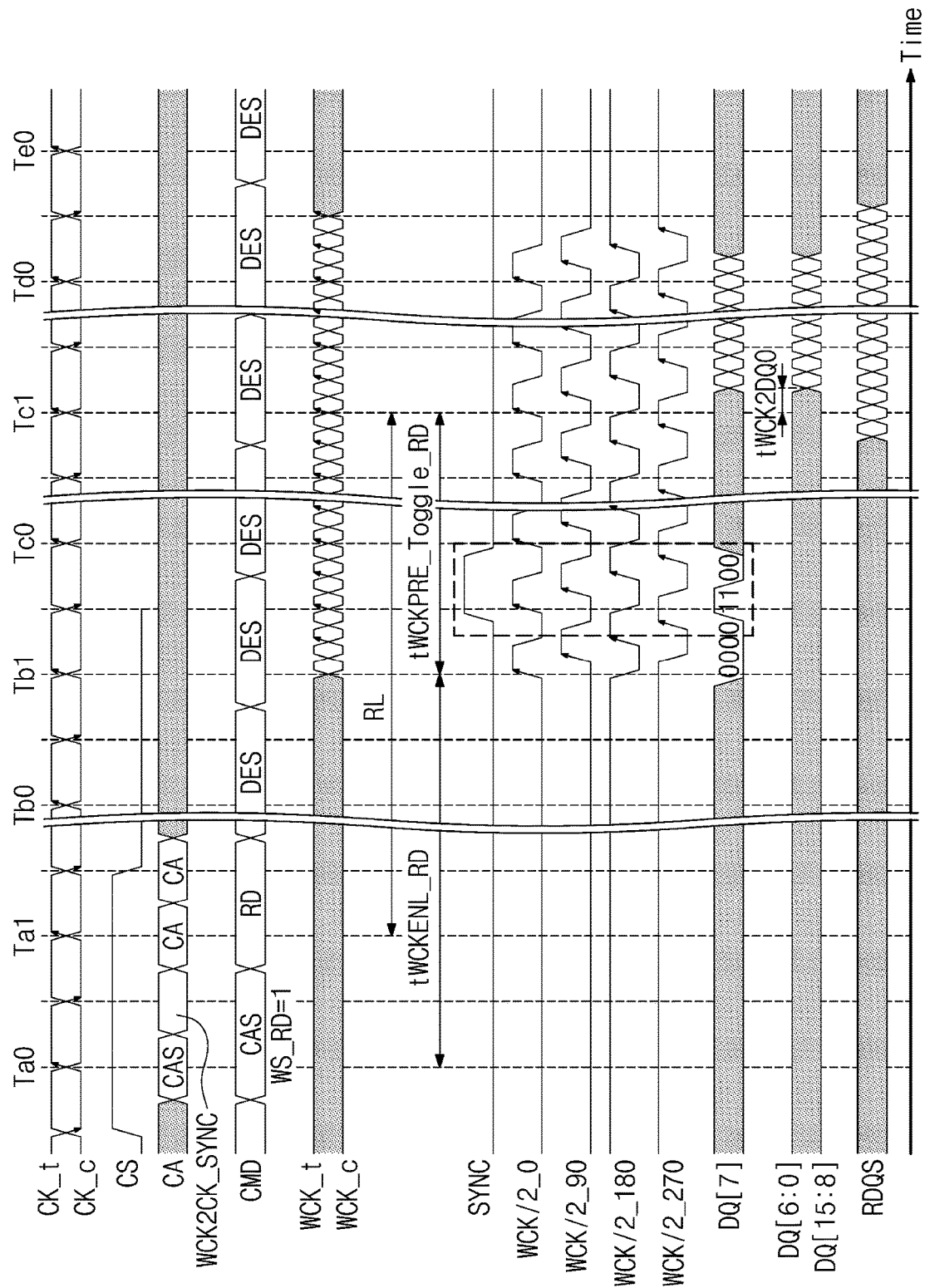
FIG. 10 is a timing diagram illustrating a read operation of a memory system of FIG. 1.

FIG. 10 is a timing diagram illustrating a read operation of a memory system of FIG. 1. For convenience of description, additional description associated with the components described above will be omitted to avoid redundancy. Referring to FIGS. 1 and 10, the memory controller 100 may send the CAS command and the read command RD to the memory device 200. In an embodiment, the CAS command may include an operand or information (e.g., WS_RD=1) indicating the synchronization operation of the data clock signal WCK. A way to send the CAS command and the read command RD is similar to that described with reference to FIG. 5, and thus, additional description will be omitted to avoid redundancy.

After a time of tWCKENL_RD passes from a time point (e.g., time point Ta0) at which the CAS command is sent, the memory controller 100 may send the data clock signals WCK_t and WCK_c having the full-rate frequency to the memory device 200. In addition, the memory controller 100 may send the data clock signals WCK_t and WCK_c and simultaneously sends the synchronization pattern through a specific data signal (e.g., DQ[7]). The memory device 200 may perform the synchronization operation on the data clock signal WCK, based on the split data clocks WCK/2_0, WCK/2_90, WCK/2_180, and WCK/2_270. This is similar to that described with reference to FIG. 7, and thus, additional description will be omitted to avoid redundancy.

In the embodiment of FIG. 10, the memory device 200 may operate in the RDQS mode. In this case, the memory device 200 may generate the read data strobe signal RDQS based on the data clock signals WCK_t and WCK_c. The memory device 200 may send read data to the memory controller 100 through data signals DQ[15:8], DQ[7], and DQ[6:0] in synchronization with the read data strobe signal RDQS.

After a time of tWCKPRE_Toggle_RD and a time of tWCK2DQO pass from a time point (e.g., Tb1) at which the transmission of the data clock signals WCK_t and WCK_c starts, the memory device 200 may send the data signals DQ[15:8], DQ[7], and DQ[6:0] to the memory controller 100.

In the embodiment of FIG. 10, a read latency RL may be from time point Ta1 to time point Tc1. Compared to the embodiment of FIG. 5, in the read latency RL of FIG. 10, the time of tWCKPRE_Static and the time of the half-rate period of the data clock signals WCK_t and WCK_c decrease. That is, compared to the conventional read operation, the read latency RL may advantageously decrease in the read operation of FIG. 10.

Figure 11:
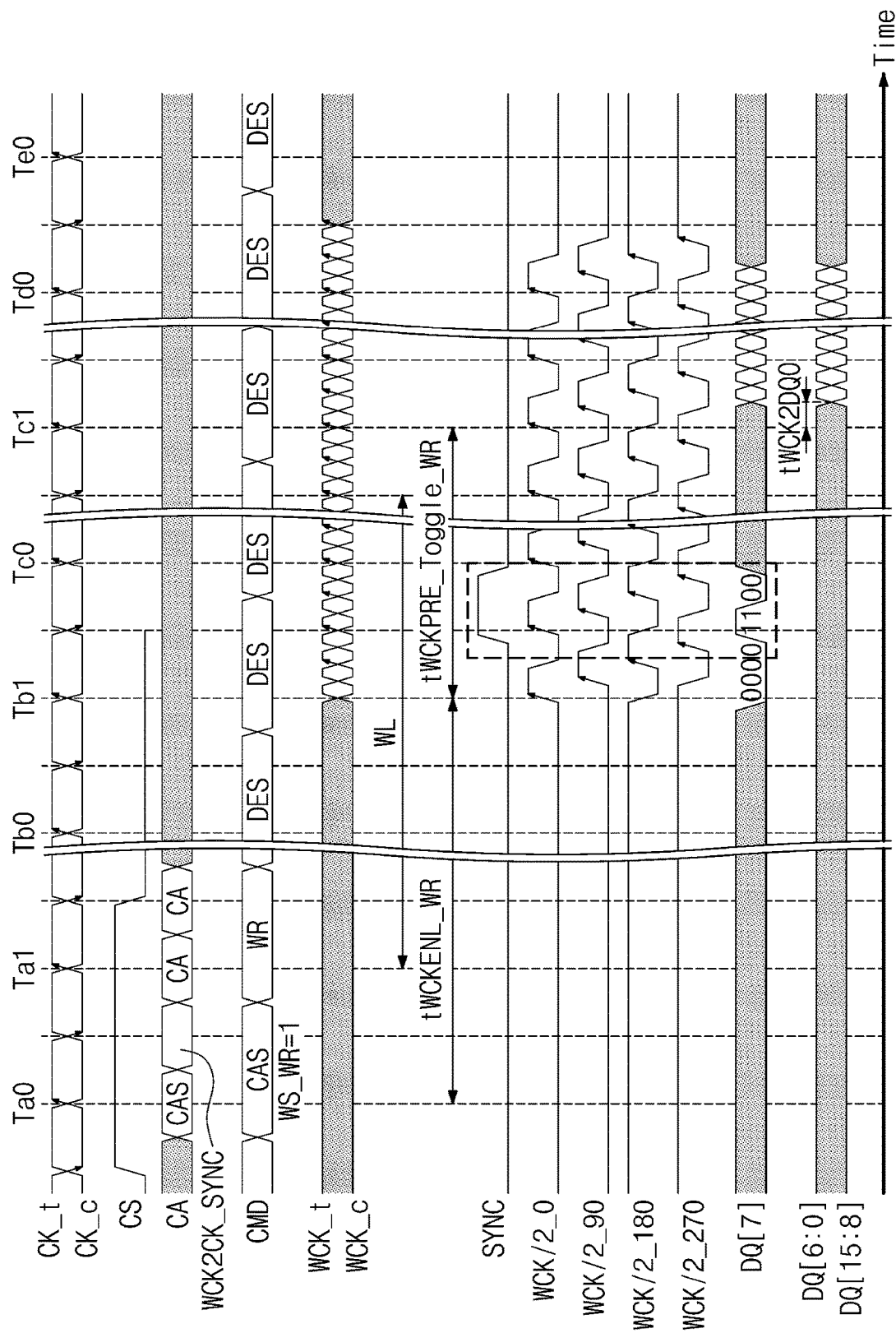
FIG. 11 is a timing diagram illustrating a write operation of a memory system of FIG. 1.

FIG. 11 is a timing diagram illustrating a write operation of a memory system of FIG. 1. For convenience of description, additional description associated with the components described above will be omitted to avoid redundancy. Referring to FIGS. 1 and 11, the memory controller 100 may send the CAS command and the write command WR to the memory device 200. In an embodiment, the CAS command may include an operand or information (e.g., WS_WR=1) indicating the synchronization operation of the data clock signal WCK. A way to send the CAS command and the write command WR is similar to that described with reference to FIG. 5, and thus, additional description will be omitted to avoid redundancy.

After a time of tWCKENL_WR passes from a time point (e.g., time point Ta0) at which the CAS command is sent, the memory controller 100 may send the data clock signals WCK_t and WCK_c having the full-rate frequency to the memory device 200. The memory controller 100 may send the data clock signals WCK_t and WCK_c and simultaneously sends the synchronization pattern through a pin associated with a specific data signal (e.g., DQ[7]). The memory device 200 may perform the synchronization operation on the data clock signals WCK_t and WCK_c by using the synchronization pattern, which is similar to that described above. Thus, additional description will be omitted to avoid redundancy.

The memory controller 100 may send write data to the memory device 200 through the data signals DQ[15:8], DQ[7], and DQ[6:0] in synchronization with the data clock signals WCK_t and WCK_c. For example, after a time of tWCKPRE_Toggle_WR and a time of tWCK2DQI pass from a time point (e.g., Tb1) at which the transmission of the data clock signals WCK_t and WCK_c starts, the memory controller 100 may send the write data to the memory device 200 through the data signals DQ[15:8], DQ[7], and DQ[6:0].

Figure 12:
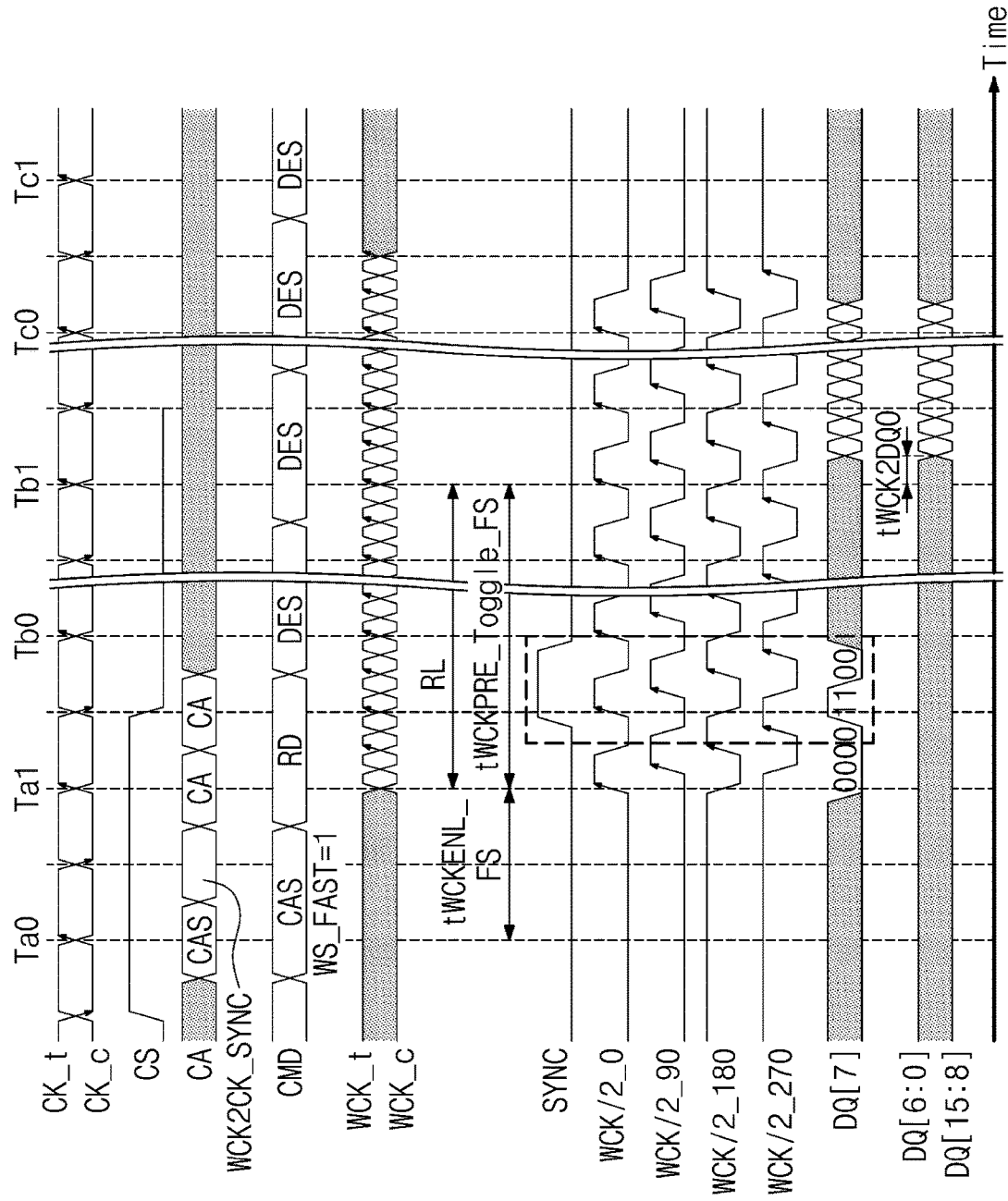
FIG. 12 is a timing diagram illustrating a read operation of a memory system of FIG. 1.

FIG. 12 is a timing diagram illustrating a read operation of a memory system of FIG. 1. For convenience of description, additional description associated with the components described above will be omitted to avoid redundancy. Referring to FIGS. 1 and 12, the memory controller 100 may send the CAS command and the read command RD to the memory device 200. In an embodiment, the CAS command may include an operand or information (e.g., WS_FAST=1) indicating the synchronization operation of the data clock signal WCK. A way to send the CAS command and the read command RD is similar to that described with reference to FIG. 5, and thus, additional description will be omitted to avoid redundancy.

In an embodiment, the CAS command of FIG. 12 may correspond to the WCK2CK synchronization operation having the minimum latency. In this case, after a time of tWCKENL_FS passes from a time point (e.g., time point Ta0) at which the CAS command is sent, the memory controller 100 may send the data clock signals WCK_t and WCK_c having the full-rate frequency to the memory device 200.

In an embodiment, as illustrated in FIG. 12, while receiving the read command RD from the memory controller 100, the memory device 200 may perform the synchronization operation on the data clock signals WCK_t and WCK_c. Although not illustrated in drawing, the memory controller 100 may send the read command RD to the memory device 200 and may then send the synchronization pattern to the memory device 200. In this case, after receiving the read command RD, the memory device 200 may receive the synchronization pattern from the memory controller 100 and may perform the synchronization operation on the data clock signals WCK_t and WCK_c.

After a time of tWCKPRE_Toggle_FS and a time of tWCK2DQO pass from a time point (e.g., Ta1 point) at which the transmission of the data clock signals WCK_t and WCK_c starts, the memory device 200 may send the read data to the memory controller 100 through the data signals DQ[15:8], DQ[7], and DQ[6:0].

Figure 13:
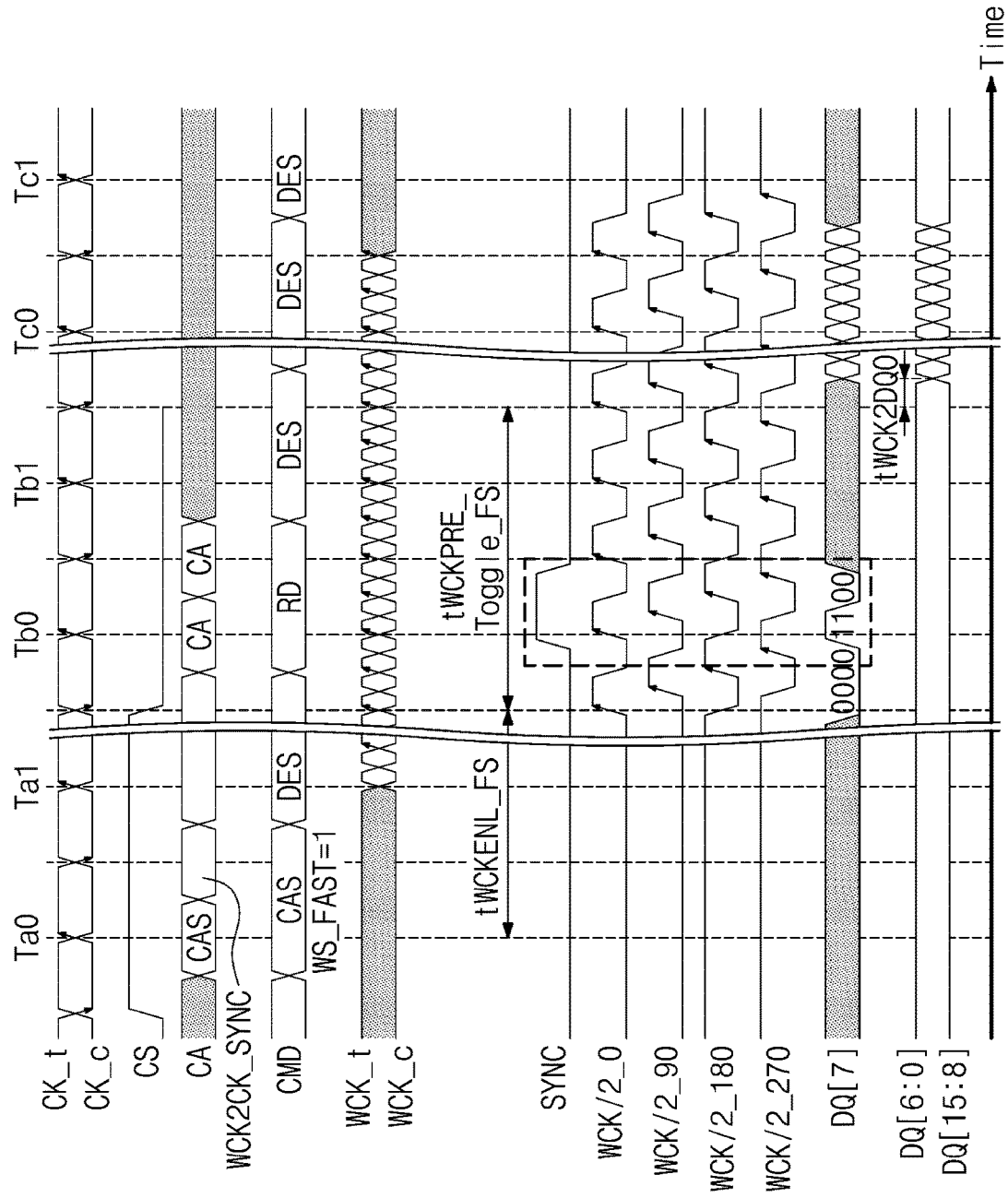
FIG. 13 is a timing diagram illustrating a read operation of a memory system of FIG. 1.

FIG. 13 is a timing diagram illustrating a read operation of a memory system of FIG. 1. For convenience of description, additional description associated with the components described above will be omitted to avoid redundancy. Referring to FIGS. 1 and 13, the memory controller 100 may send the CAS command and the read command RD to the memory device 200. In an embodiment, the CAS command may include an operand or information (e.g., WS_FAST=1) indicating the synchronization operation of the data clock signal WCK. A way to send the CAS command and the read command RD is similar to that described with reference to FIG. 5, and thus, additional description will be omitted to avoid redundancy.

The embodiment of FIG. 13 shows an operation in which the CAS command and the read command RD has a command gap. In this case, the embodiment of FIG. 13 is similar to the embodiment described with reference to FIG. 12 except that transmission time points of the read command RD and some delay times are different, and thus, additional description will be omitted to avoid redundancy.

Figure 14:
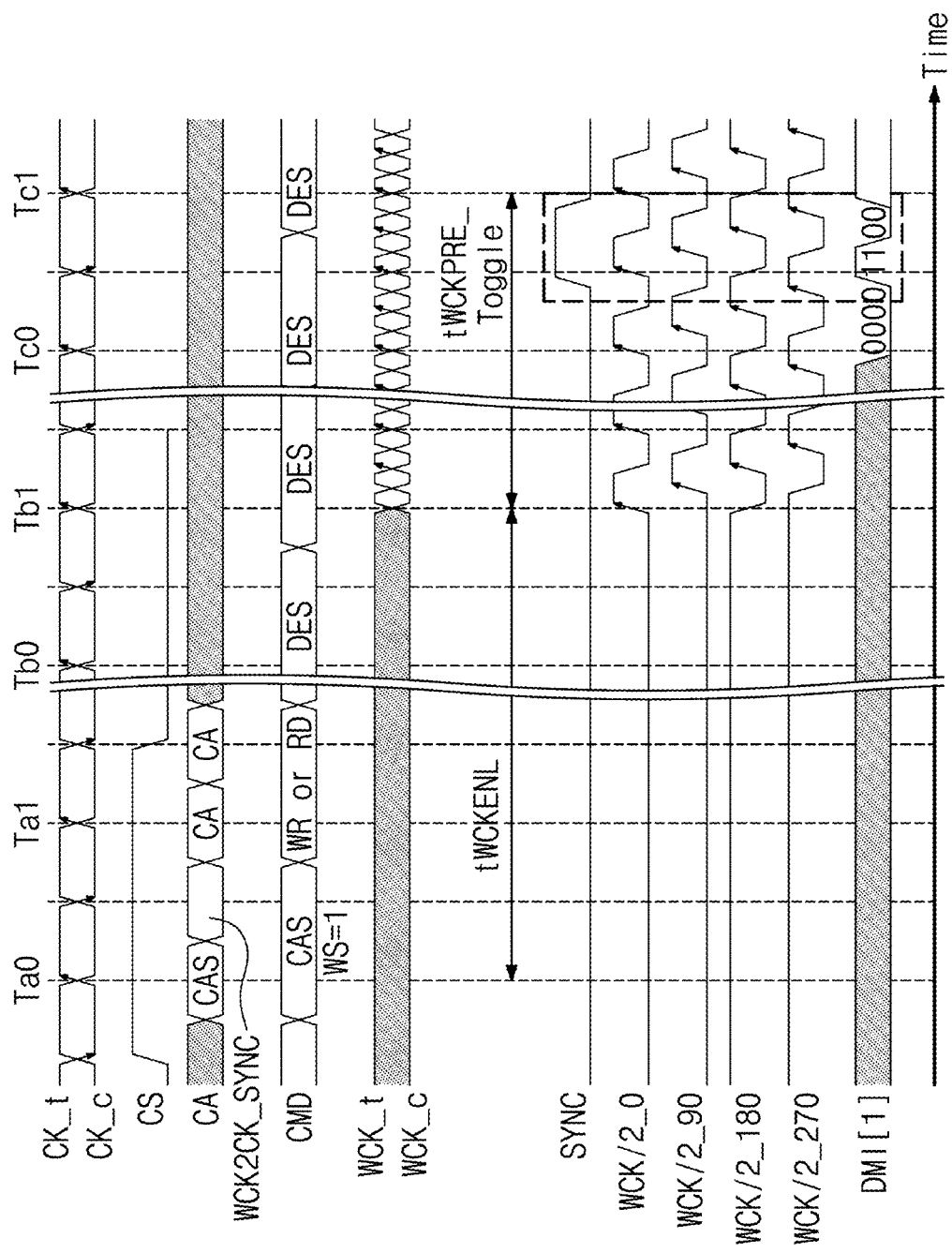
FIG. 14 is a timing diagram illustrating an operation of a memory system of FIG. 1.

FIG. 14 is a timing diagram illustrating an operation of a memory system of FIG. 1. For convenience of description, additional description associated with the components described above will be omitted to avoid redundancy. Referring to FIGS. 1 and 14, the memory controller 100 may send the CAS command and the operation command (e.g., WR or RD) to the memory device 200. In an embodiment, the CAS command may include an operand or information indicating the synchronization operation of the data clock signal WCK. The CAS command and the operation command (e.g., WR or RD) are described with reference to FIG. 7, and thus, additional description will be omitted to avoid redundancy.

After the time of tWCKENL passes from a time point (i.e., time point Ta0) at which the CAS command is sent, the memory controller 100 may send the data clock signals WCK_t and WCK_c to the memory device 200. This is similar to that described with reference to FIG. 7, and thus, additional description will be omitted to avoid redundancy.

In the above embodiments, the memory controller 100 may send the synchronization pattern to the memory device 200 through at least one of a plurality of data signals. However, the present disclosure is not limited thereto. For example, the memory controller 100 may send the synchronization pattern to the memory device 200 through at least one of various signals that are driven in synchronization with the data clock signals WCK_t and WCK_c. For example, as illustrated in FIG. 14, the memory controller 100 may send the synchronization pattern through a data mask inversion signal DMI[1]. The embodiment of FIG. 14 is similar to the above embodiments except that the synchronization pattern is provided through the data mask inversion signal DMI[1], and thus, additional description will be omitted to avoid redundancy.

Figure 15:
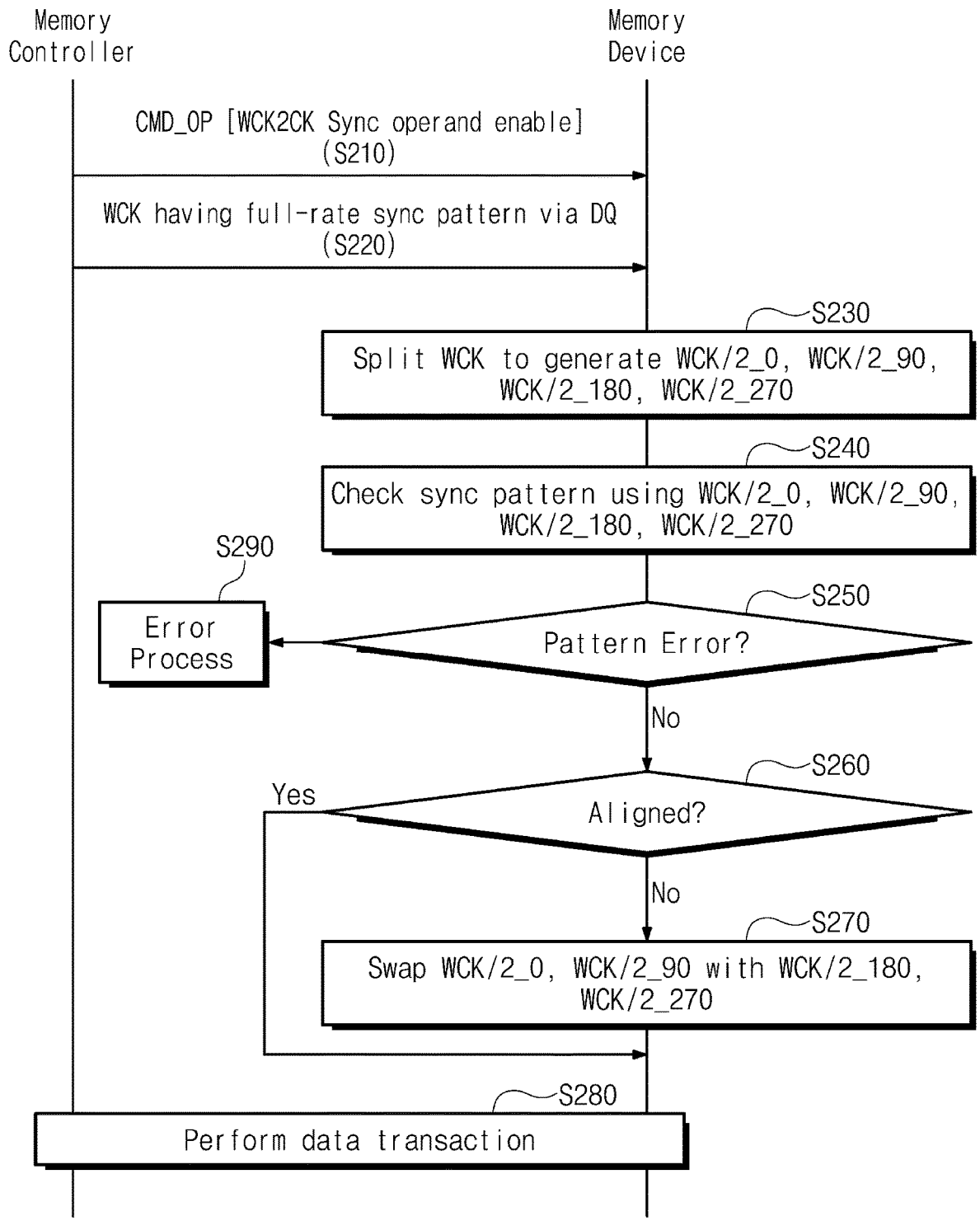
FIG. 15 is a flowchart illustrating an operation of a memory system of FIG. 1.

FIG. 15 is a flowchart illustrating an operation of a memory system of FIG. 1. Referring to FIGS. 1 and 15, the memory controller 100 and the memory device 200 may perform operation S210 to operation S240. Operation S210 to operation S240 are similar to operation S110 to operation S140 of FIG. 6, and thus, additional description will be omitted to avoid redundancy. In operation S250, the memory device 200 may determine whether a pattern error is included in the checking or sampling result. For example, the data clock signals WCK_t and WCK_c have the alignment state or the misalignment state. In this case, according to the above embodiments, it is assumed that the synchronization pattern is "00001100" and four lower bit values of the synchronization pattern are checked or sampled. Under the above assumption, when the data clock signals WCK_t and WCK_c are in the alignment state, the checking or sampling result may be "1100"; when the data clock signals WCK_t and WCK_c are in the misalignment state, the checking or sampling result may be "0011". In contrast, when the checking or sampling result are different from the above values (e.g., "1010", "0101", "0100", or "1101"), the state (e.g., the alignment or misalignment state) of the data clock signals WCK_t and WCK_c may not be determined.

In this case, in operation S290, the memory device 200 may perform error processing. For example, the memory device 200 may reset the data clock splitter 210. Alternatively, the memory device 200 may send an error situation for the data clock signals WCK_t and WCK_c to the memory controller 100, and the memory controller 100 may again send the data clock signals WCK_t and WCK_c to the memory device 200 or may reset the memory device 200.

When the pattern error is absent from the checking or sampling result, the memory controller 100 and the memory device 200 may perform operation S260 to operation S280. Operation S260 to operation S280 are similar to operation S150 to operation S170 of FIG. 6, and thus, additional description will be omitted to avoid redundancy.

Figure 16:
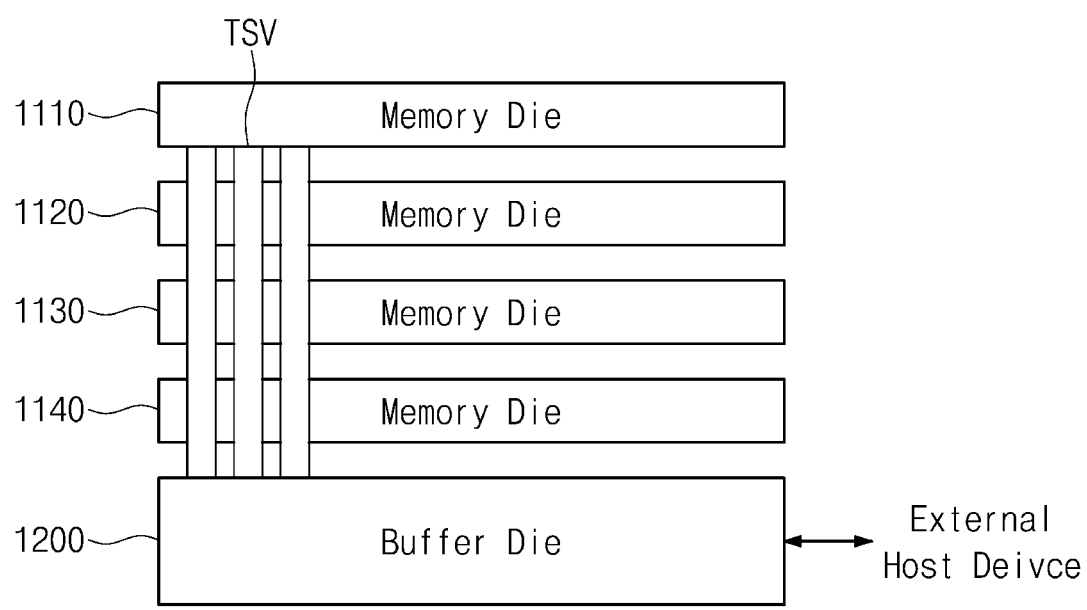
FIG. 16 is a diagram illustrating an example of a memory package according to an embodiment of the present disclosure.

FIG. 16 is a diagram illustrating an example of a memory package according to an embodiment of the present disclosure. Referring to FIG. 16, a memory package 1000 may include a plurality of memory dies 1110 to 1140 and a buffer die 1200. Each of the plurality of memory dies 1110 to 1140 may be a DRAM device. The plurality of memory dies 1110 to 1140 and the buffer die 1200 may be implemented in a stacked structure, may be electrically connected with each other through TSV (through silicon via), and may communicate with each other.

In an embodiment, the memory package 1000 may be provided as one semiconductor package through packaging by the following: package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), small outline (SOIC), shrink small outline package (SSOP), thin small outline (TSOP), thin quad flatpack (TQFP), system in package (SIP), multi-chip package (MCP), wafer-level fabricated package (WFP), or wafer-level processed stack package (WSP).

The buffer die 1200 may communicate with an external host device (or a memory controller). The buffer die 1200 may be configured to temporarily store data to be written in the plurality of memory dies 1110 to 1140 or to temporarily store data read from the plurality of memory dies 1110 to 1140. The plurality of memory dies 1110 to 1140 and the buffer die 1200 may communicate with each other based on the operation method described with reference to FIGS. 1 to 15. Alternatively, the buffer die 1200 and an external host device may communicate with each other based on the operation method described with reference to FIGS. 1 to 15.

Figure 17:
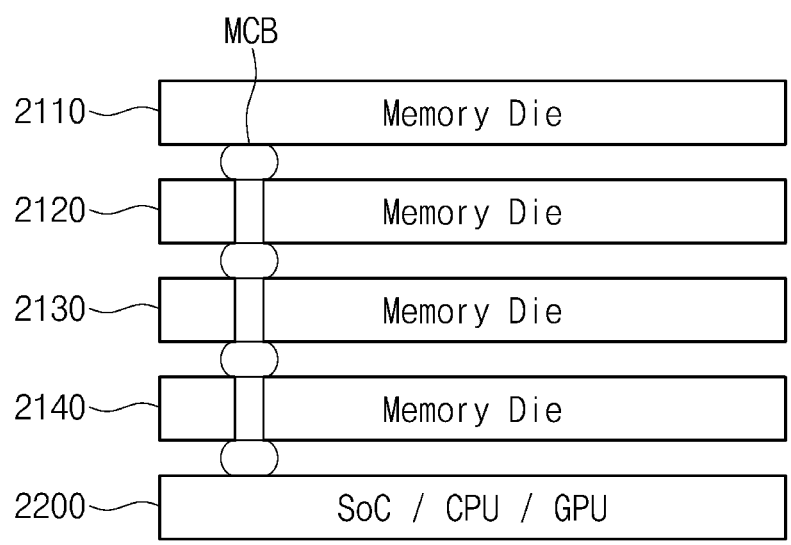
FIG. 17 is a diagram illustrating an example of a memory package according to an embodiment of the present disclosure.

FIG. 17 is a diagram illustrating an example of a memory package according to an embodiment of the present disclosure. Referring to FIG. 17, a memory package 2000 may include a plurality of memory dies 2110 to 2140 and a host die 2200. The plurality of memory dies 2110 to 2140 may be electrically connected with each other through micro bumps MCB, may have a stacked structure, and may be directly stacked on the host die 2200. The host die 2200 may be a SoC, a CPU, or a GPU. In an embodiment, each of the plurality of memory dies 2110 to 2140 and a host die 2200 may communicate with each other based on the operation method described with reference to FIGS. 1 to 15.

Figure 18:
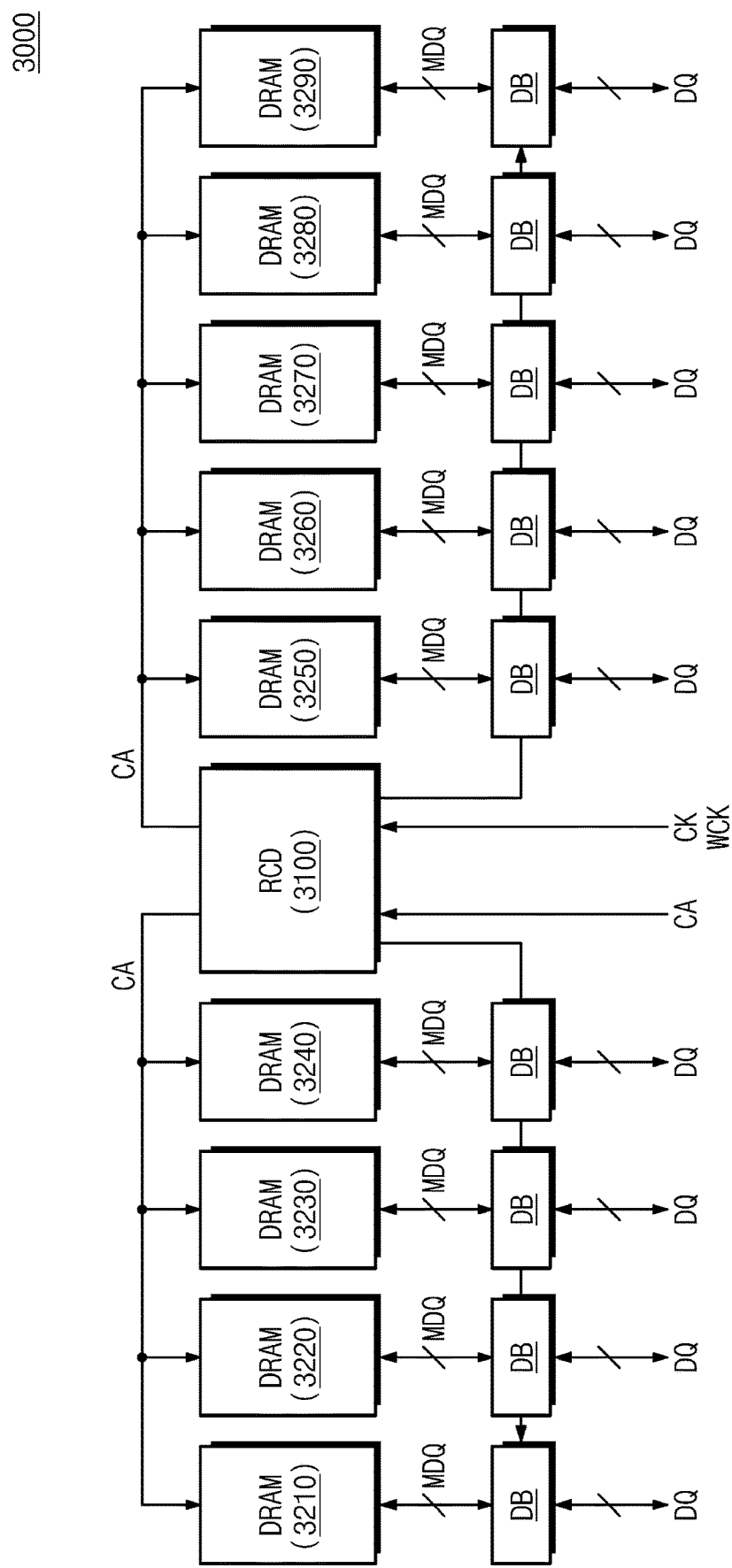
FIG. 18 is a block diagram illustrating a memory module to which a memory device according to the present disclosure is applied.

FIG. 18 is a block diagram illustrating a memory module 3000 to which a memory device according to the present disclosure is applied. Referring to FIG. 18, the memory module 3000 may include a register clock driver (RCD) 3100, a plurality of memory devices 3210 to 3290, and a plurality of data buffers DB. The RCD 3100 may receive the command/address CA, the clock signal CK, and the data clock signal WCK from an external device (e.g., a host or a memory controller). In response to the received signals, the RCD 3100 may send the command/address CA to the plurality of memory devices 3210 to 3290 and may control the plurality of data buffers DB.

The plurality of memory devices 3210 to 3290 may be respectively connected with the plurality of data buffers DB through memory data lines MDQ. In an embodiment, each of the plurality of memory devices 3210 to 3290 may be the memory device described with reference to FIGS. 1 to 18, and may be configured to communicate with an external controller based on the operation method described with reference to FIGS. 1 to 18.

In an embodiment, the memory module 3000 illustrated in FIG. 18 may have the form factor of a load reduced dual in-line memory module (LRDIMM). However, the present disclosure is not limited thereto. For example, the memory module 3000 may have the form factor of a registered DIMM (RDIMM) in which the plurality of data buffers DB are not included.

Figure 19:
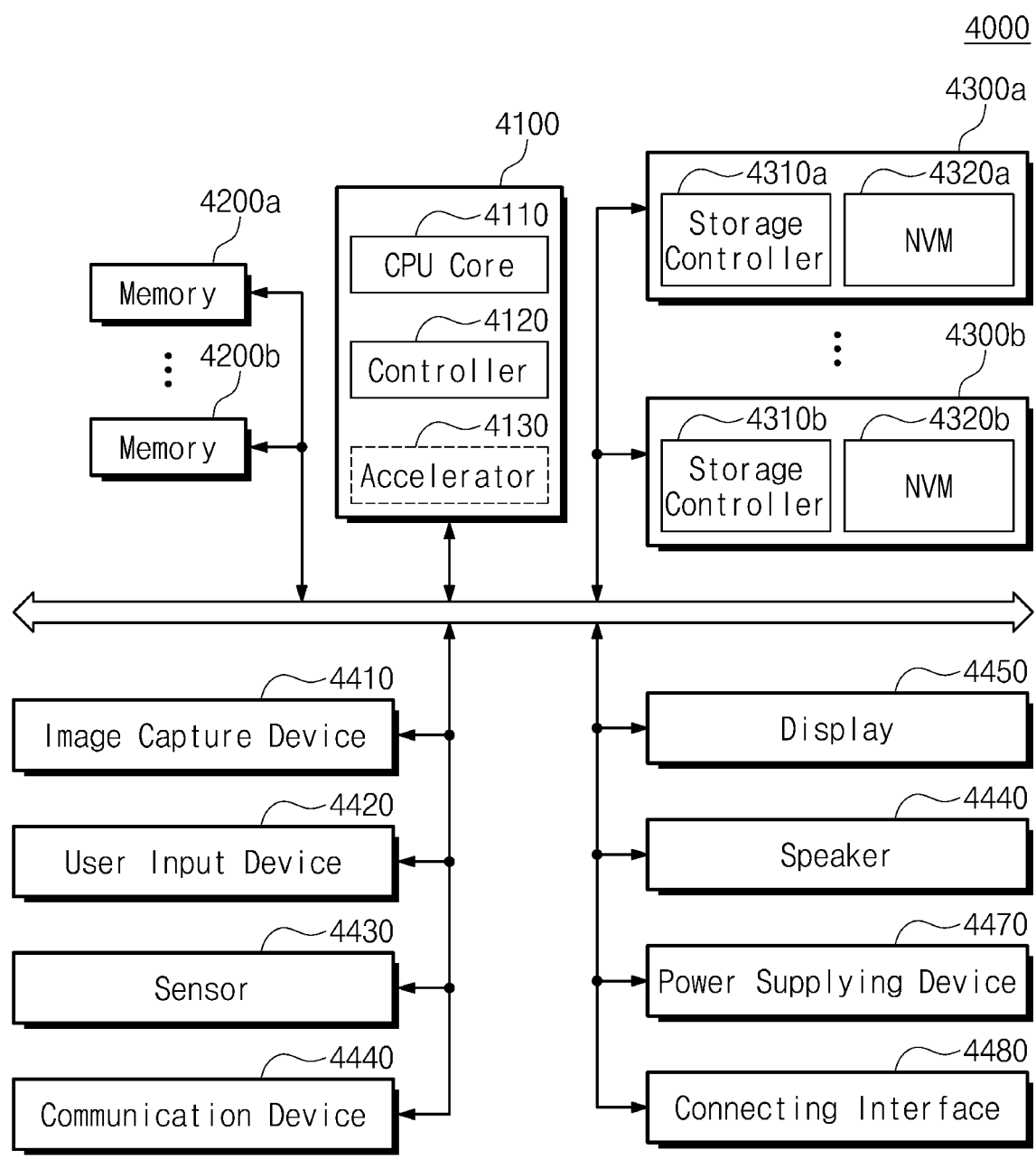
FIG. 19 is a diagram illustrating a system according to an embodiment of the present disclosure.

FIG. 19 is a diagram of a system 4000 to which a storage device is applied, according to an embodiment. The system 4000 of FIG. 19 may basically be a mobile system, such as a portable communication terminal (e.g., a mobile phone), a smartphone, a tablet personal computer (PC), a wearable device, a healthcare device, or an Internet of things (IOT) device. However, the system 4000 of FIG. 19 is not necessarily limited to the mobile system and may be a PC, a laptop computer, a server, a media player, or an automotive device (e.g., a navigation device).

Referring to FIG. 19, the system 4000 may include a main processor 4100, memories (e.g., 4200a and 4200b), and storage devices (e.g., 4300a and 4300b). In addition, the system 4000 may include at least one of an image capturing device 4410, a user input device 4420, a sensor 4430, a communication device 4440, a display 4450, a speaker 4460, a power supplying device 4470, and a connecting interface 4480.

The main processor 4100 may control all operations of the system 4000, more specifically, operations of other components included in the system 4000. The main processor 4100 may be implemented as a general-purpose processor, a dedicated processor, or an application processor.

The main processor 4100 may include at least one CPU core 4110 and further include a controller 4120 configured to control the memories 4200a and 4200b and/or the storage devices 4300a and 4300b. In some embodiments, the main processor 4100 may further include an accelerator 4130, which is a dedicated circuit for a high-speed data operation, such as an artificial intelligence (AI) data operation. The accelerator 4130 may include a graphics processing unit (GPU), a neural processing unit (NPU) and/or a data processing unit (DPU) and be implemented as a chip that is physically separate from the other components of the main processor 4100.

The memories 4200a and 4200b may be used as main memory devices of the system 4000. Although each of the memories 4200a and 4200b may include a volatile memory, such as static random access memory (SRAM) and/or dynamic RAM (DRAM), each of the memories 4200a and 4200b may include non-volatile memory, such as a flash memory, phase-change RAM (PRAM) and/or resistive RAM (RRAM). The memories 4200a and 4200b may be implemented in the same package as the main processor 4100.

In an embodiment, each of the memories 4200a and 4200b may be the memory device described with reference to FIGS. 1 to 18, and may be configured to communicate with the main processor 4100 based on the operation method described with reference to FIGS. 1 to 18.

The storage devices 4300a and 4300b may serve as non-volatile storage devices configured to store data regardless of whether power is supplied thereto, and have larger storage capacity than the memories 4200a and 4200b. The storage devices 4300a and 4300b may respectively include storage controllers (STRG CTRL) 4310a and 4310b and NVM (Non-Volatile Memory)s 4320a and 4320b configured to store data via the control of the storage controllers 4310a and 4310b. Although the NVMs 4320a and 4320b may include flash memories having a two-dimensional (2D) structure or a three-dimensional (3D) V-NAND structure, the NVMs 4320a and 4320b may include other types of NVMs, such as PRAM and/or RRAM.

The storage devices 4300a and 4300b may be physically separated from the main processor 4100 and included in the system 4000 or implemented in the same package as the main processor 4100. In addition, the storage devices 4300a and 4300b may have types of solid-state devices (SSDs) or memory cards and be removably combined with other components of the system 400 through an interface, such as the connecting interface 4480 that will be described below. The storage devices 4300a and 4300b may be devices to which a standard protocol, such as a universal flash storage (UFS), an embedded multi-media card (eMMC), or a non-volatile memory express (NVMe), is applied, without being limited thereto.

The image capturing device 4410 may capture still images or moving images. The image capturing device 4410 may include a camera, a camcorder, and/or a webcam. The user input device 4420 may receive various types of data input by a user of the system 4000 and include a touch pad, a keypad, a keyboard, a mouse, and/or a microphone. The sensor 4430 may detect various types of physical quantities, which may be obtained from the outside of the system 4000, and convert the detected physical quantities into electric signals. The sensor 4430 may include a temperature sensor, a pressure sensor, an illuminance sensor, a position sensor, an acceleration sensor, a biosensor, and/or a gyroscope sensor.

The communication device 4440 may transmit and receive signals between other devices outside the system 4000 according to various communication protocols. The communication device 4440 may include an antenna, a transceiver, and/or a modem. The display 4450 and the speaker 4460 may serve as output devices configured to respectively output visual information and auditory information to the user of the system 4000.

The power supplying device 4470 may appropriately convert power supplied from a battery (not shown) embedded in the system 4000 and/or an external power source, and supply the converted power to each of components of the system 4000.

The connecting interface 4480 may provide connection between the system 4000 and an external device, which is connected to the system 4000 and capable of transmitting and receiving data to and from the system 4000. The connecting interface 4480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

According to the present disclosure, a memory device with improved reliability and improved performance, an operation method of the memory device, and an operation method of a memory controller are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method of operating a memory device, comprising:
   receiving, from a memory controller, an operation command that is synchronized with a clock signal;
   receiving, from the memory controller, a data clock signal having a full-rate frequency and a synchronization pattern provided by at least one of a plurality of data signals; and
   synchronizing the clock signal and the data clock signal using a synchronization operation based on the synchronization pattern.

2. The method of claim 1, wherein the data clock signal is received immediately after a first delay time passes from a time point at which the operation command is received.

3. The method of claim 2, wherein the first delay time is a delay time necessary to prepare the synchronization operation.

4. The method of claim 1, wherein said synchronizing includes:
   generating four split data clocks based on the data clock signal having the full-rate frequency;
   sampling the synchronization pattern based on the four split data clocks and a synchronization signal; and
   then, when a sampling result of the sampling does not correspond to at least a part of the synchronization pattern, swapping some of the four split data clocks with others of the four split data clocks.

5. The method of claim 4,
   wherein the synchronization pattern includes eight bits; and
   wherein four lowermost bits of the synchronization pattern are sampled based on the four split data clocks and the synchronization signal.

6. The method of claim 1, wherein the synchronization pattern is received through the at least one of the plurality of data signals from a time point at which the data clock signal having the full-rate frequency is received.

7. The method of claim 1, wherein the synchronization pattern is received through the at least one of the plurality of data signals after a second delay time passes from a time point at which the data clock signal having the full-rate frequency is received.

8. The method of claim 1, further comprising:
   sending read data to the memory controller or receiving write data from the memory controller, after said synchronizing is performed and a third delay time passes from a time point at which the data clock signal having the full-rate frequency is received.

9. The method of claim 1, wherein, when the operation command includes information about a minimum delay synchronization operation, then the data clock signal having the full-rate frequency commences to be received from the memory controller while the operation command is being received.

10. The method of claim 9, wherein, when the operation command includes the information about the minimum delay synchronization operation, then the synchronization operation is performed while the operation command is being received.

11. The method of claim 9, wherein, when the operation command includes the information about the minimum delay synchronization operation, the synchronization operation is commenced after the operation command is received.

12. The method of claim 1, wherein information about the synchronization pattern is set in a mode register by the memory controller.

13. The method of claim 1, wherein the memory device is an LPDDR SDRAM device.

14. A method of operating a memory controller, comprising:
   sending a CAS command and a read command from the memory controller to a memory device, which is electrically coupled to the memory controller;
   then, immediately after a first delay time passes from a time point at which the CAS command is sent, sending a data clock signal having a full-rate frequency to the memory device along with a synchronization pattern that is provided as at least one of a plurality of data signals; and
   after a second delay time passes from a time point at which the data clock signal commences to be sent, receiving read data from the memory device through the plurality of data signals.

15. The method of claim 14, further comprising:
   receiving a read data strobe signal from the memory device; and
   wherein the read data are received in synchronization with the read data strobe signal.

16. The method of claim 14, wherein, while the read command is being sent to the memory device, a data clock signal having a full-rate frequency is also sent to the memory device.

17. The method of claim 14,
wherein the synchronization pattern is sent to the memory device after a third delay time passes from a time point at which the data clock signal having the full-rate frequency commences to be sent to the memory device; and
wherein the third delay time is shorter than the second delay time.

18. The method of claim 14, further comprising:
loading information about the synchronization pattern into a mode register of the memory device.

19. A memory device, comprising:
a memory core;
a command/address decoder configured to receive a clock signal from a memory controller and to decode a command/address signal received from the memory controller based on the clock signal;
a data clock splitter configured to receive a data clock signal of a full rate from the memory controller and to generate four split data clocks by splitting the data clock signal;
a reception circuit configured to sequentially output write data received through a plurality of data signals from the memory controller to the memory core in synchronization with the four split data clocks; and
a transmission circuit configured to send read data received from the memory core to the memory controller through the plurality of data signals in synchronization with the four split data clocks; and
wherein, while the data clock signal of the full rate is being received from the memory controller, the data clock splitter is further configured to perform a synchronization operation on the data clock signal based on a synchronization pattern received through at least one of the plurality of data signals.

20. The memory device of claim 19,
wherein the command/address decoder is further configured to generate a synchronization signal based on a decoding result;
wherein the data clock splitter samples the synchronization pattern based on the four split data clocks in response to the synchronization signal; and
wherein, when a sampled value does not correspond to at least a part of the synchronization pattern, the data clock splitter performs the synchronization operation by swapping some of the four split data clocks with others of the four split data clocks.

* * * * *